US010294044B2

(12) United States Patent
Lanigan, Sr. et al.

(10) Patent No.: US 10,294,044 B2
(45) Date of Patent: *May 21, 2019

(54) PORT LIFT BEAM SYSTEM

(71) Applicant: Mi-Jack Products, Inc., Hazel Crest, IL (US)

(72) Inventors: John J. Lanigan, Sr., Orland Park, IL (US); Myron Glickman, Arlington Heights, IL (US); Ralph Swanson, Lockport, IL (US); Eric Van Gorp, Schererville, IN (US); Martin Conneally, Downers Grove, IL (US)

(73) Assignee: Mi-Jack Products, Inc., Hazel Crest, IL (US)

(*) Notice: Subject to any disclaimer, the term of this patent is extended or adjusted under 35 U.S.C. 154(b) by 216 days.

This patent is subject to a terminal disclaimer.

(21) Appl. No.: 15/280,689

(22) Filed: Sep. 29, 2016

(65) Prior Publication Data

US 2018/0086577 A1    Mar. 29, 2018

(51) Int. Cl.
*B65G 63/02* (2006.01)
*B65G 63/06* (2006.01)
*B65G 67/02* (2006.01)

(52) U.S. Cl.
CPC ......... *B65G 63/025* (2013.01); *B65G 63/065* (2013.01); *B65G 67/02* (2013.01)

(58) Field of Classification Search
CPC .... B65G 63/025; B65G 63/065; B65G 67/02; B65G 67/24; B65G 2814/0313
USPC ................................................ 414/391, 572
See application file for complete search history.

(56) References Cited

U.S. PATENT DOCUMENTS

| | | | | |
|---|---|---|---|---|
| 2,069,236 A | * | 2/1937 | Fitch | B65G 63/065 104/32.1 |
| 3,151,751 A | * | 10/1964 | Marini | B61B 1/005 414/21 |
| 3,764,028 A | * | 10/1973 | Blackburn | B65G 63/065 254/45 |
| 4,549,842 A | * | 10/1985 | Tidmarsh | B66F 9/04 254/45 |
| 7,331,747 B2 | * | 2/2008 | Gardner | B65G 63/065 414/392 |
| 8,465,244 B2 | * | 6/2013 | Lanigan, Sr. | B65G 63/065 414/391 |
| 8,892,243 B1 | | 11/2014 | Lanigan et al. | |
| 9,463,962 B2 | * | 10/2016 | Petkov | B66C 15/065 |
| 9,889,787 B2 | * | 2/2018 | Thomas | B60P 3/07 |

(Continued)

*Primary Examiner* — James Keenan
(74) *Attorney, Agent, or Firm* — McCracken & Gillen LLC

(57) ABSTRACT

A system for handling shipping containers includes first and second lifting beams and first and second holding beams. The system further includes a plurality of vertical beams wherein the plurality of vertical beams support the first and second lifting beams and the first and second holding beams. In the system, first and second pluralities of lifting shoes are disposed respectively on each of the first and second lifting beams while first and second pluralities of holding shoes are disposed respectively on each of the first and second holding beams. The system also has a hoisting mechanism that raises and lowers the first and second lifting beams, and the first and second lifting beams, the first and second holding beams, the plurality of vertical beams, and the hoisting mechanism are arranged to form a lift beam system.

24 Claims, 23 Drawing Sheets

(56) References Cited

U.S. PATENT DOCUMENTS

2001/0002010 A1* 5/2001 Franzen .................. B66C 1/663
                                                        212/325
2017/0217696 A1* 8/2017 Lanigan, Sr. ........ B65G 63/025

* cited by examiner

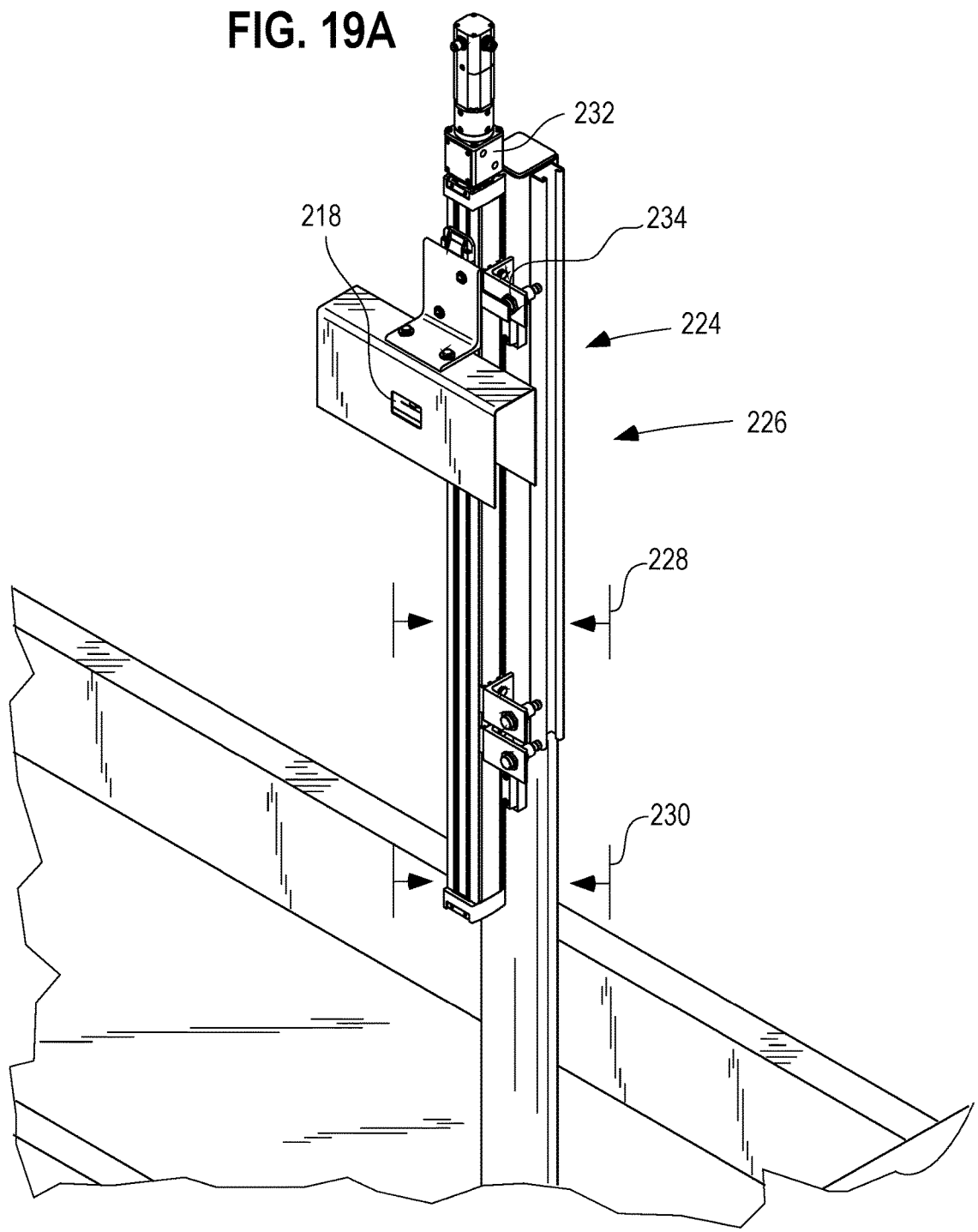

US 10,294,044 B2

PORT LIFT BEAM SYSTEM

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF THE DISCLOSURE

The present subject matter relates to the transfer and storage of cargo involved in intermodal transportation, and more particularly, to the loading and unloading of shipping containers proximal a port.

BACKGROUND

Under today's standards, goods are often transported from one location to another via an intermodal transportation system that combines shipment by air, sea, rail, and land. To facilitate the shipment of goods between one form of transportation and another, goods are shipped in containers that can be loaded on container ships, truck chassis, and rail cars. The efficient loading and unloading of containers, and the storage of containers therebetween, is a goal of an intermodal transportation system.

For these and other reasons, a lift beam system for loading, unloading, and storing containers would be an important improvement in the art.

SUMMARY

According to one aspect, a system for handling shipping containers includes first and second lifting beams and first and second holding beams. The system further includes a plurality of vertical beams wherein the plurality of vertical beams support the first and second lifting beams and the first and second holding beams. In the system, first and second pluralities of lifting shoes are disposed respectively on each of the first and second lifting beams while first and second pluralities of holding shoes are disposed respectively on each of the first and second holding beams. The system also has a hoisting mechanism that raises and lowers the first and second lifting beams, and the first and second lifting beams, the first and second holding beams, the plurality of vertical beams, and the hoisting mechanism are arranged to form a lift beam system.

According to another aspect, a system for raising and lowering shipping containers, comprises at least one lifting beam having a plurality of lifting shoes disposed therealong and at least one holding beam having a plurality of holding shoes disposed therealong. The system further includes a lower containment cavity substantially below the at least one holding beam, and an upper containment cavity substantially above the at least one holding beam wherein the lifting beam moves between a first position in the lower containment cavity and a second position in the upper containment cavity. Further still, the container is transferred between the plurality of lifting shoes and the plurality of holding shoes when the lifting beam is at the second position.

Other aspects and advantages will become apparent upon consideration of the following detailed description and the attached drawings wherein like numerals designate like structures throughout the specification.

BRIEF DESCRIPTION OF THE DRAWINGS

FIG. 19A is a partial isometric view of the port lift beam system showing details of a sensor arrangement;

DETAILED DESCRIPTION

Figure 1:
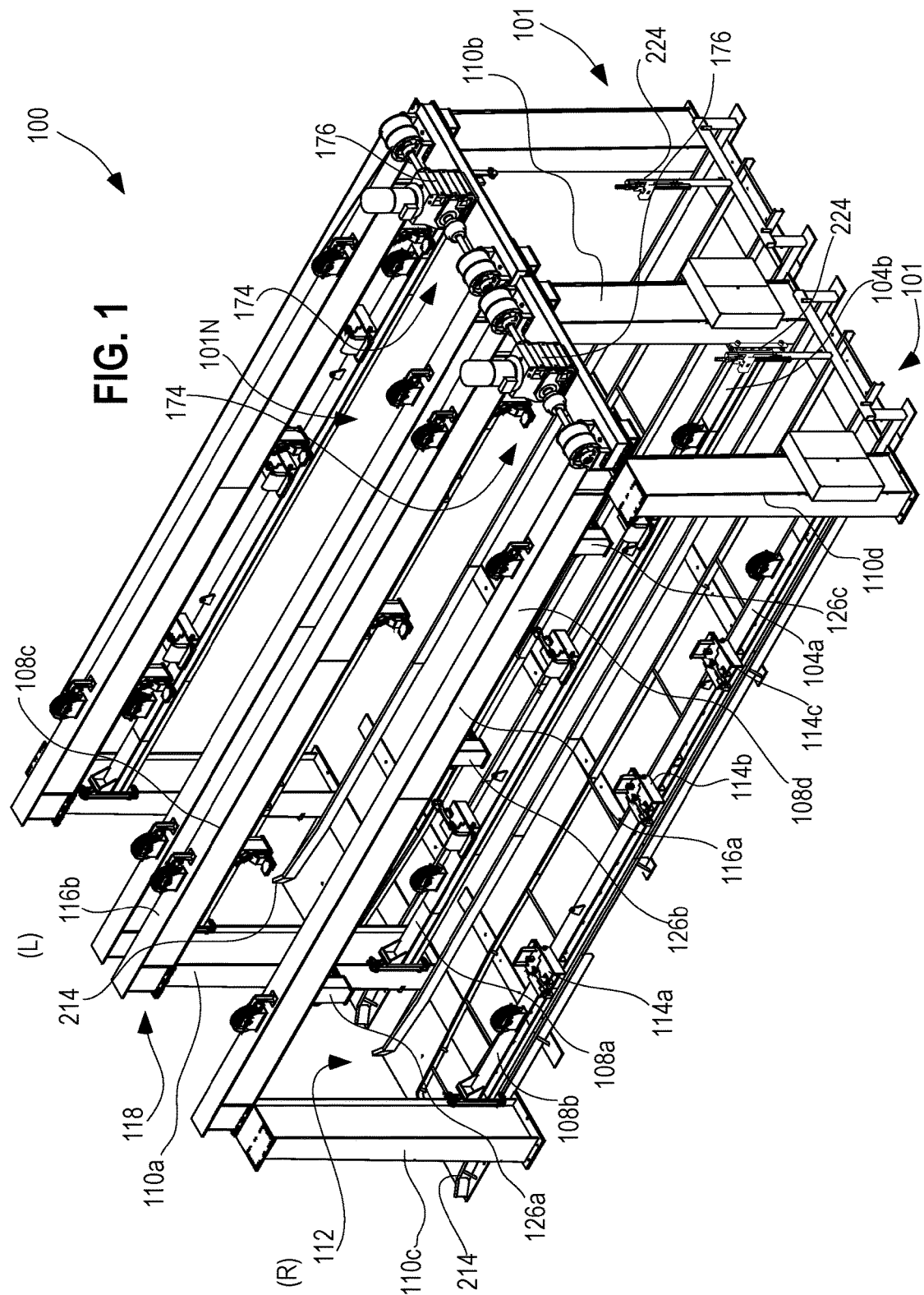
FIG. 1 is an isometric view from behind of a port lift beam system having two lift beam systems arranged next to one another.
Figure 2:
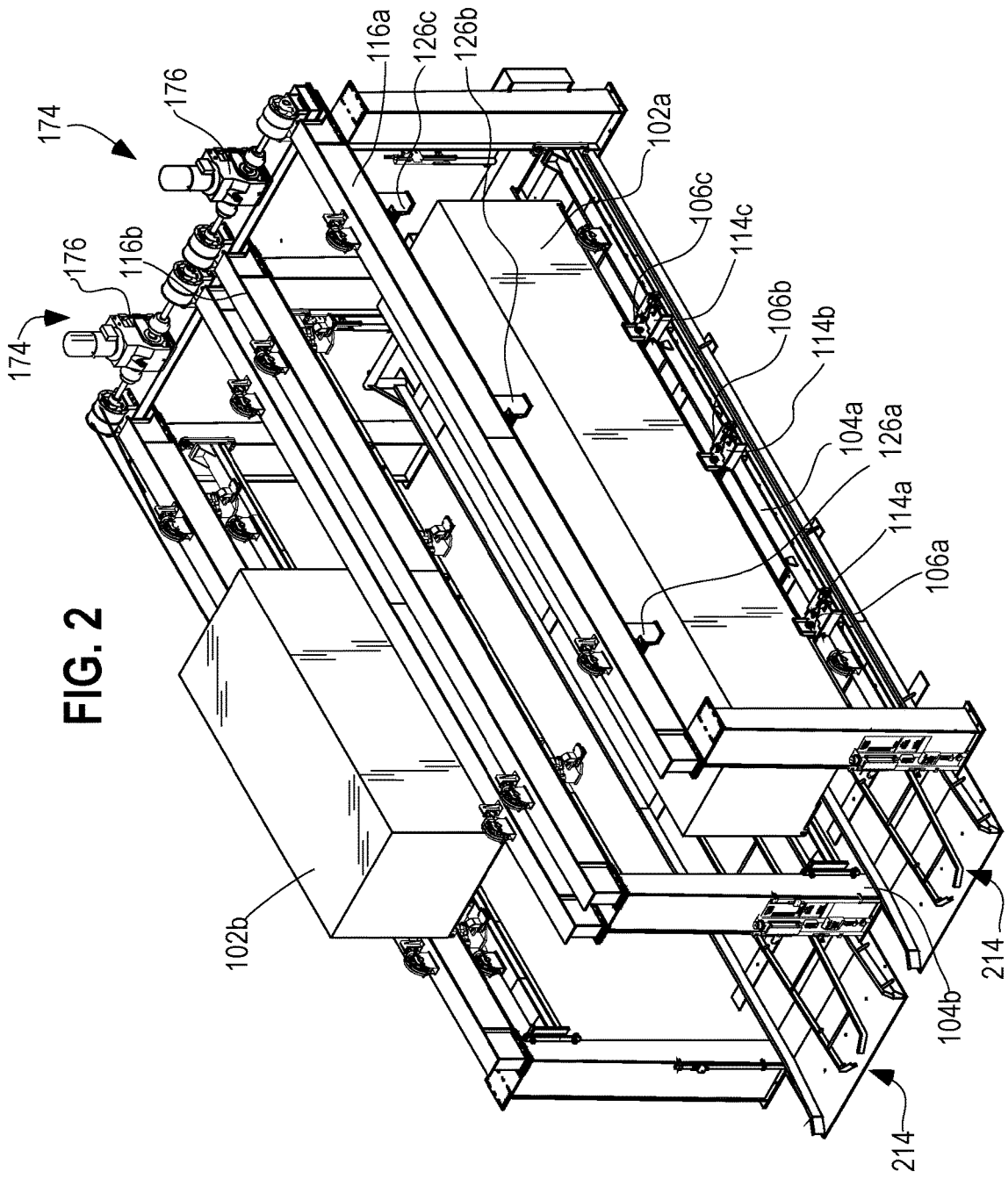
FIG. 2 is an isometric view from the front of the system of FIG. 1 showing the lift beam systems in various stages of operation during which containers are hoisted from a lower containment cavity to an upper containment cavity.

A port lift beam system 100 is described in FIGS. 1 and 2 during varying stages of operation. The system 100 handles shipping containers 102a, 102b . . . 102N. The shipping containers may be ISO standard containers with lengths of 20 feet, 40 feet, and 45 feet. While the example embodiment detailed throughout the description and shown in the accompanying FIGS. is called a port lift beam system 100, the system 100 may be adapted for application to other settings such as a rail yard, warehouse, or other logistics operation. The container lengths described herein are frequently found in intermodal shipping operations involving a port, however, the system 100 may be easily modified to handle shipping containers of different sizes more suitable to a particular application and/or setting.

The port lift beam system 100 may include one or more individual lift beam systems 101. Each lift beam system 101 lifts the outbound containers 102 from a standard container chassis with lifting beams 104a, 104b, and associated lifting shoes 106. The system 101 may also lower the inbound containers 102 on to a standard container chassis with the lifting beams 104a, 104b and associated lifting shoes 106. Tractor-trailer chassis or other container transport mechanisms may deliver the outbound containers 102 to the port lift beam system 100 for eventual transfer on to a ship or rail car. Further, each port lift beam system 100 may store two outbound containers for staging a ship or train loading operation. Likewise, a crane may deliver the inbound containers 102 from a ship or train to the port lift beam system 100. Again, each port lift beam system 100 may store two inbound containers if storage space is desired before the inbound containers 102 are transferred to tractor-trailer chassis for continued intermodal transport.

Referring now to FIGS. 1 and 2, one or more lift beam system 101, 101b . . . 101N may be arranged side-by-side to form an array of container bays, each bay having an individual lift beam system 101, 101b disposed thereabout. The individual lift beam systems 101, 101b arranged side-by-side may share some structural components such as vertical or horizontal beams, anchors, or driving mechanisms to be described below.

The lift beam system 101 includes four vertical beams 110a, 110b, 110c, 110d arranged around a lower containment cavity 112 that the container 102 may occupy. Two vertical beams 110a, 110b, 110c, 110d are arranged on each side of the lower containment cavity 112. Horizontal beams 108a, 108b, 108c, 108d run parallel to the lower containment cavity 112. Two horizontal beams 108a, 108b, 108c, 108d are provided on either side of the cavity 112. The first set of two horizontal beams 108a, 108c connects the vertical beams 110a, 110b present on the first side (L) of the lift beam system 101 and the second set of horizontal beams 108b, 108d connects the vertical beams 110c, 110d present on the second side (R).

The lower horizontal beam 108a, 108b on each side is configured to function as a lift beam 104a, 104b. Each lift beam 104a, 104b includes lifting shoes 106 and lifting shoe assemblies 114, see FIGS. 3, 4, 5, 6, 7, and 8. The lifting beams 104a, 104b on each side of the lower containment cavity 112 are substantially identical, therefore, only the lift beam assembly 104a will be described in detail below. In an example configuration seen in FIG. 3, the lift beam 104a has three lifting shoes 106a, 106b, 106c arranged to face the lower containment cavity 112 when deployed.

The upper horizontal beam on each side 108c, 108d is configured to be a holding beam 116a, 116b. Like the lift beams 104a, 104b discussed above, the holding beams 116a, 116b on each side of an upper containment cavity 118 are substantially identical, and therefore only the holding beam assembly 116a will be described in detail hereinbelow. The holding beam 116a has holding shoes 120a, 120b, 120c that may be utilized to store the container 102 in the upper containment cavity 118 that is formed between the holding beams 116a, 116b and above the lower containment cavity 112. Generally, the lift beams 104a, 104b are arranged to lift the container 102 from the lower containment cavity 112 to the upper containment cavity 118 where the container 102 may be stored on the holding shoes 120. The lift beam system 101 performs this function by deploying lifting shoes 106 under the container 102 and hoisting the lift beams 104a, 104b with the container 102 carried thereon, from an initial, lower position 122 to a second, upper position 124, as seen in FIG. 2.

In an alternative embodiment, the lifting beams 104a, 104b may have four lifting shoes 106, fewer than three lifting shoes 106, or any suitable number of lifting shoes 106, in order to differently distribute weight or accommodate containers that vary in length. Likewise, the holding beams 116a, 116b may have four holding shoes 120, fewer than three holding shoes 120, or any suitable number of holding shoes 120, in order to similarly distribute the weight of the container or accommodate containers of varying sizes.

Alternatively, with reference to later FIGS. 13-18, a crane or another mechanism may lower the container 102 on to the holding shoes 120 of the holding beams 116a, 116b such that the lifting beams 104a, 104b may rise until the lifting shoes 106 thereon meet the container 102 already in the second, upper position 124. The load of the container 102 is transferred from the holding shoes 120 to the lifting shoes 106, and then the lifting beams 104a, 104b may lower the container from the second, upper position 124 to the initial, lower position 122.

Figure 9:
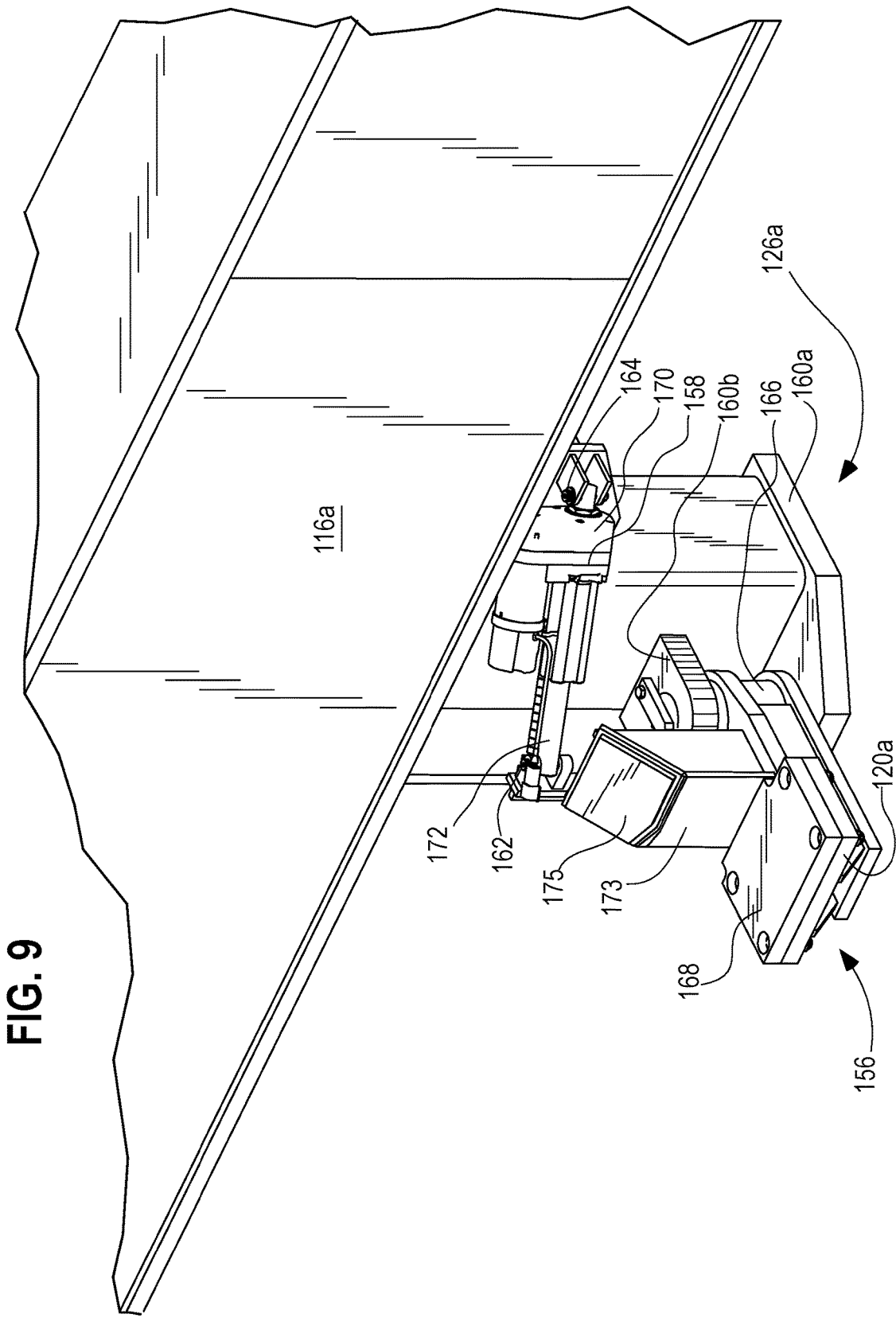
FIG. 9 is an isometric view from the front of a single deployed holding shoe before and after engagement of the holding shoe with the container.

Referring still to FIGS. 13-18, and again detailing only lifting beam 104a and holding beam 116a, if the holding shoes 120a, 120b, 120c of the holding beam 116a are not presently holding a container, then the outbound container 102 may be automatically lifted from the initial, lower position 122 on a chassis to the second, upper position 124 within the upper containment cavity 118 above the holding shoes 120a, 120b, 120c. When the holding shoes 120a, 120b, 120c are not presently holding a container, the holding shoes 120a, 120b, 120c are stored and operated by each associated holding shoe assembly 126a, 126b, 126c, underneath the holding beam 116a as shown in FIG. 9. Likewise, lifting shoes 106a, 106b, 106c are partially housed within and operated by each associated lifting shoe assembly 114a, 114b, 114c as shown in FIG. 3.

Figure 3:
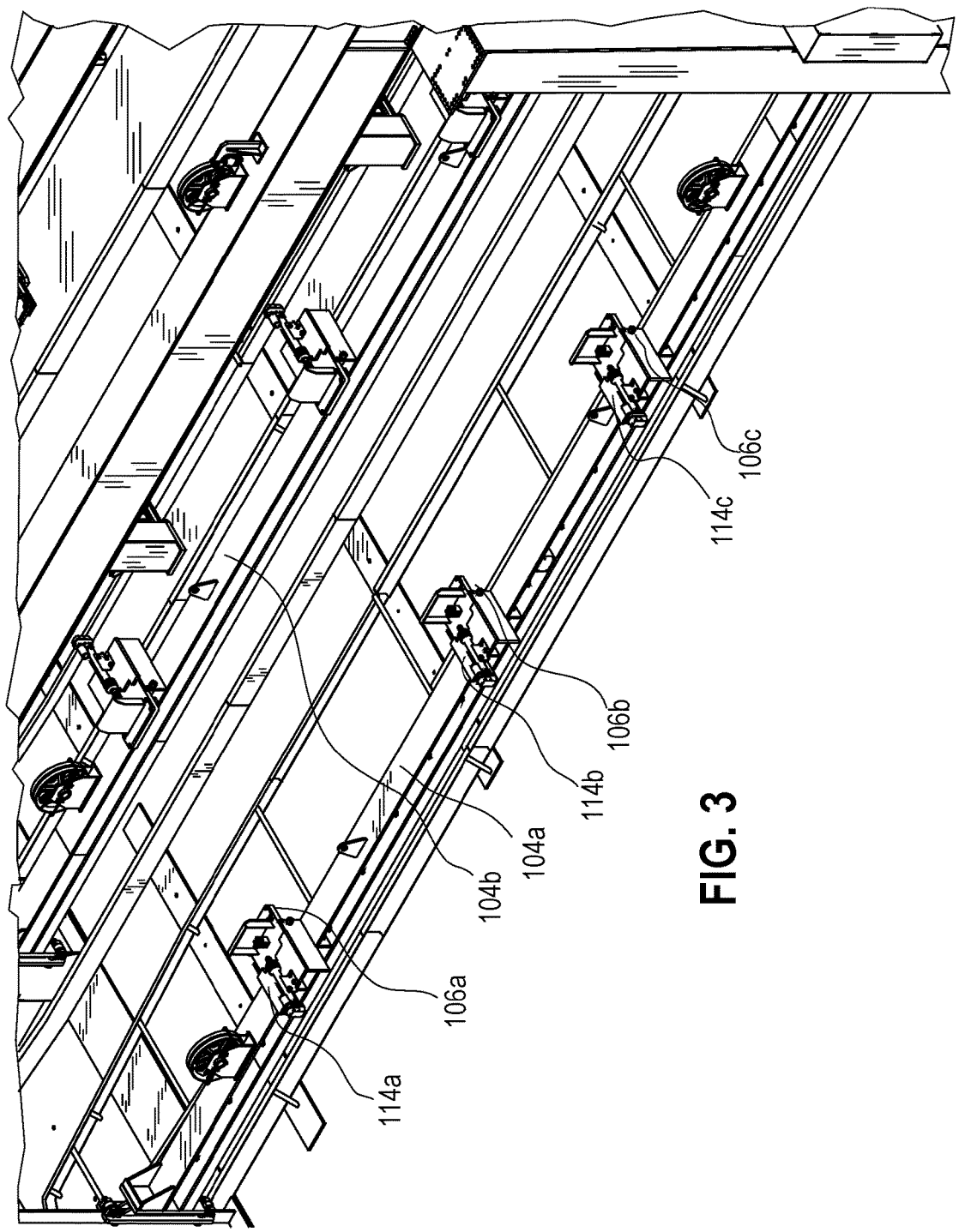
FIG. 3 is a partial isometric view of one side of the lift beam system showing a lifting beam in detail.
Figure 19:
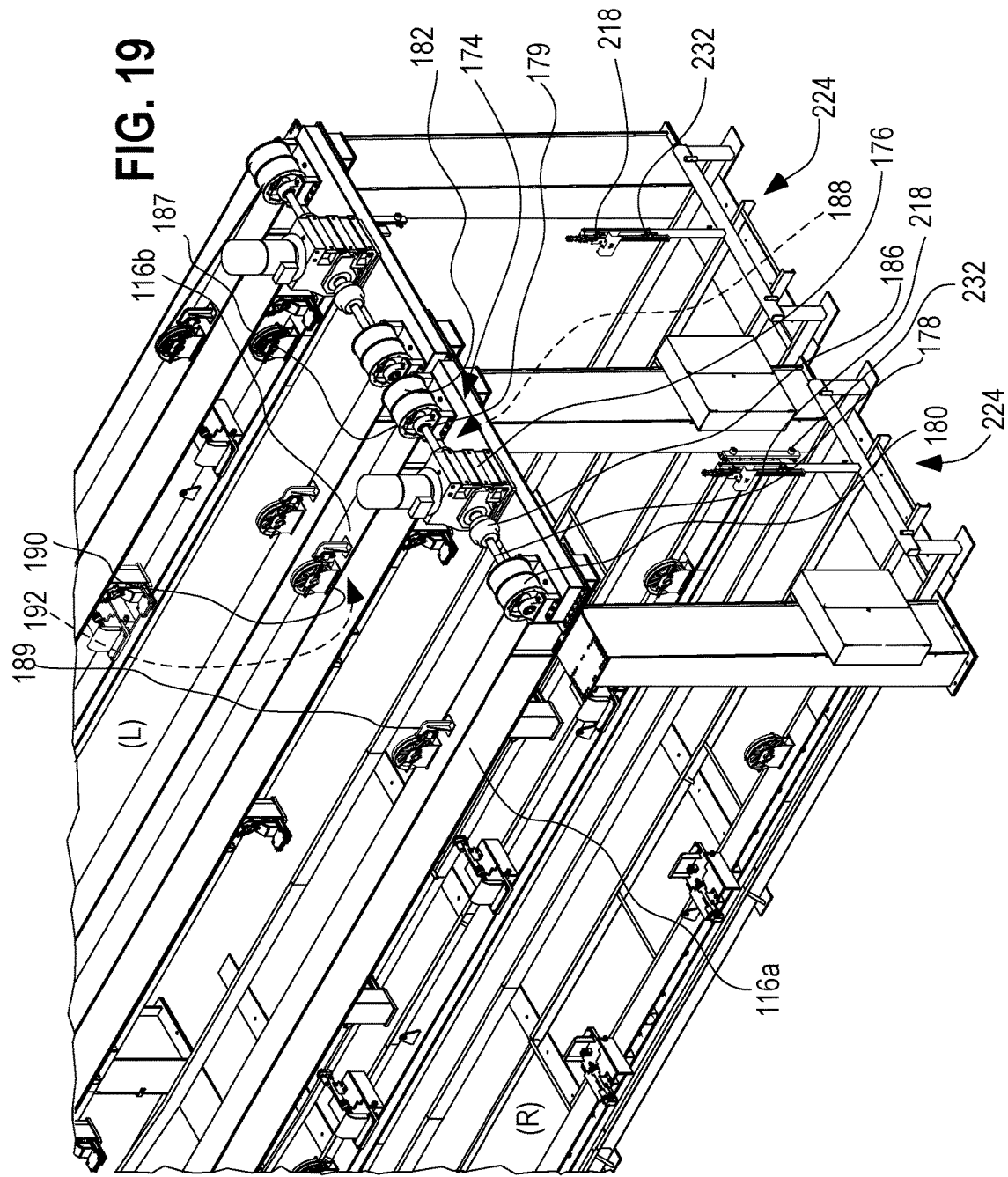
FIG. 19 is an isometric view of the port lift beam system showing details of a hoisting mechanism arranged at the back of each lift beam system.

The lifting beam 104a depicted in FIG. 3 shows the relative location of the lifting shoes 106a, 106b, 106c along the length of the lifting beam 104a. The lifting shoes 106a, 106b, 106c are configured such that combinations thereof are capable of lifting containers of differing dimensions. Specifically, lifting shoes 106a and 106b are utilized when the lift beam system 101 accommodates a container 20 feet in length such as is shown in FIG. 2 (container 102b). When a 20-foot container is accommodated, the lifting shoe 106c is not utilized, as the container is shorter than the distance between the lifting shoes 106a and 106c. At least, two lifting shoes 106a and 106c are utilized when the lift beam system 101 accommodates a container 40 or 45 feet in length such as is shown in FIG. 2 (container 102a—40-foot container). Alternatively, all three lifting shoes 106a, 106b, 106c may be used when the lift beam system 101 accommodates the 40 and 45 foot containers. As shown in FIGS. 19 and 19A, and described below with reference thereto, a sensor measures the length of the container 102 and provides such information to specially adapted PLC logic. The PLC logic then controls the specific combination of the lifting shoes 106 and holding shoes 120 that are deployed in order to accommodate containers of varying sizes.

Figure 4:
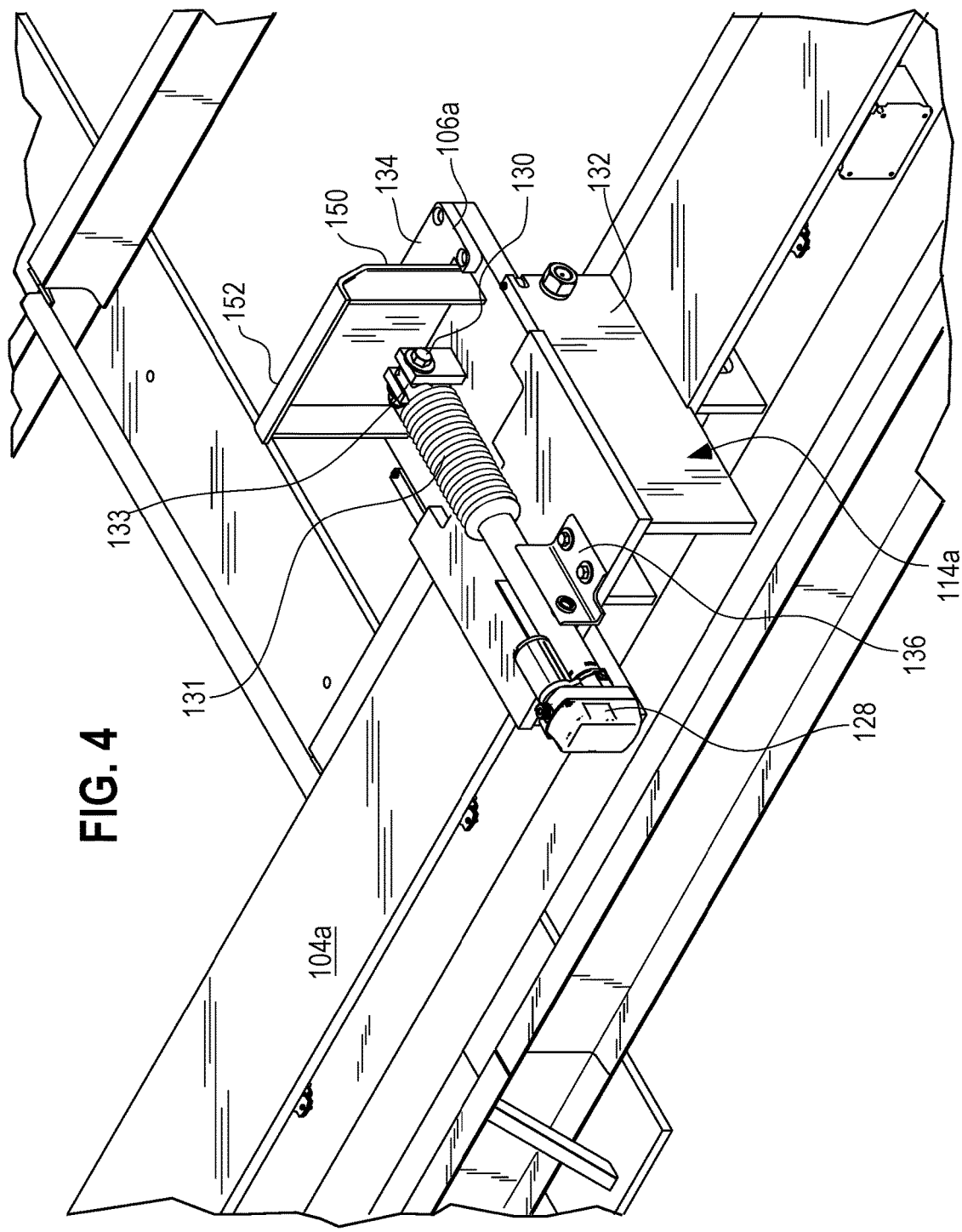
FIG. 4 is an isometric view from behind of a single deployed lifting shoe before and after engagement of the lifting shoe with the container.

Referring now to FIG. 4, a detailed view of the lifting shoe 106a and lifting shoe assembly 114a are shown situated on an upper surface of the lifting beam 104a. Both the lifting shoe assemblies 114a, 114b, 114c and the associated lifting shoes 106a, 106b, 106c are substantially identical in operation, differing only in location along the lifting beams 104a, 104b. Therefore, only lifting shoe assembly 114a will be described in detail herein.

FIG. 4 shows the lifting shoe assembly 114a from outside the lower containment cavity 112. The lifting shoe assembly 114a includes the lifting shoe 106a, the lifting shoe actuator 128, lifting shoe pin 130, lifting shoe housing 132, lifting shoe pad 134, and vertical container guide plate 150. The lifting shoe housing 132 is mounted on the upper surface of the lifting beam 104*a*. Bolts, screws, pins, and/or other connections may be used to fixedly secure the lifting shoe housing 132 to the lifting beam 104*a*. Alternatively, the lifting shoe housing 132 may be an integral part of the lifting beam 104*a* or may be welded thereto.

The lifting shoe actuator 128 is further mounted on the upper surface of the lifting shoe housing 132. Again, bolts, screws, pins, and/or other connections may be used to fixedly secure an actuator mount 136, which holds the lifting shoe actuator 128 in place, to the lifting shoe housing 132. Alternatively, the actuator mount 136 may be integrally formed with the lifting shoe housing 132 or welded thereto. The lifting shoe actuator 128 may be an electric actuator, a hydraulic actuator, a pneumatic actuator, or any other suitable actuator for extending the lifting shoe 106*a* out and away from the lifting shoe housing 132. For example, the lifting shoe actuator 128 may be a 24-volt DC electric linear actuator.

Figure 6:
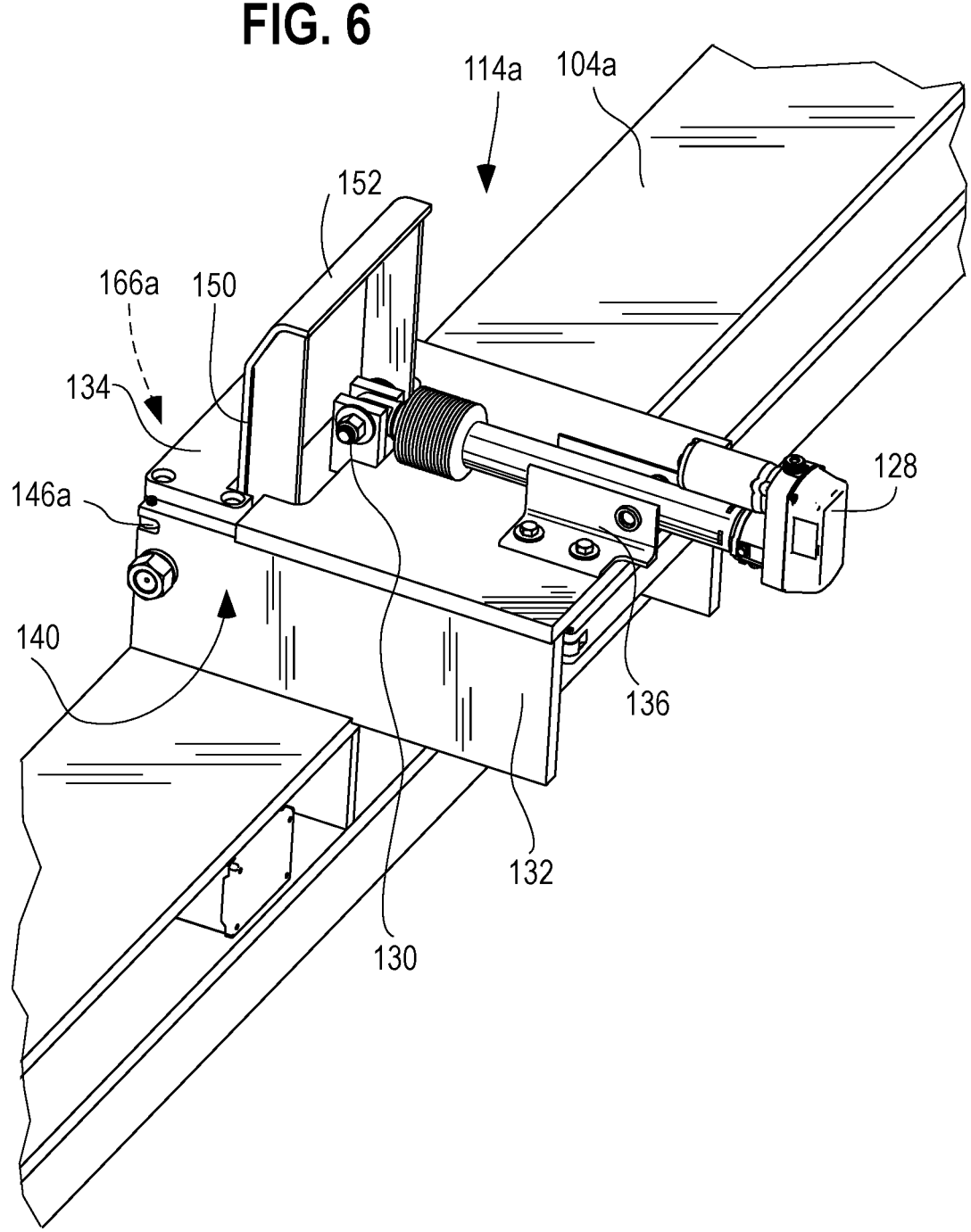
Figure 8:
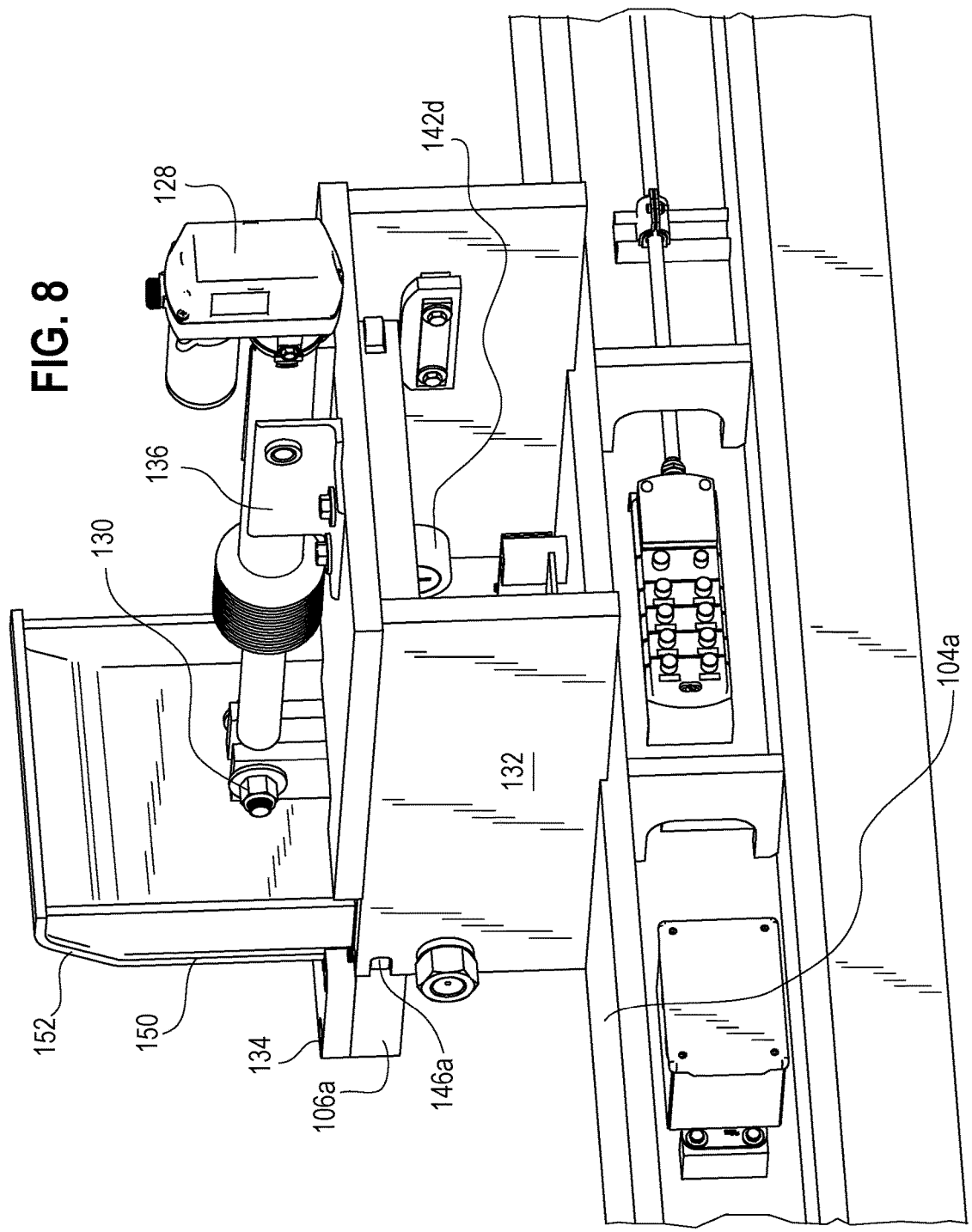

The lifting shoe actuator 128 is operatively coupled to the lifting shoe 106*a* by a pin 130, as shown in FIGS. 4, 6, and 8. Alternative connections may operatively couple the lifting shoe actuator 128 to the lifting shoe 106*a* such as a screw joint, a bolted joint, or any other suitable connection type capable of translating the axial force produced by the lifting shoe actuator 128 to the lifting shoe 106*a* in both the forward and backward horizontal directions. The operative coupling of the lifting shoe actuator 128 and the lifting shoe 106*a* allows the actuator 128 to both push and pull the lifting shoe 106*a*.

FIGS. 4-8 depict the lifting shoe 106*a* in various stages of deployment. As noted above, the lifting shoe actuator 128 pushes the lifting shoe 106*a* from an initial, retracted position 140 partially within the lifting shoe housing 132 to a deployed position 148 distal to the lifting shoe housing 132 and the lifting beam 104*a*. In the initial, retracted position 140, the lifting shoe 106*a* is partially housed within the lifting shoe housing 132. FIGS. 4-8 further show a bellows 131 that provides a protective cover for the lifting shoe actuator 128. The bellows 131 deploys and retracts with the lifting shoe actuator 128 in an accordion style. Alternatively, protective covers may instead be used to sheath a rigid extendable portion 133, such as a metal rod, of the lifting shoe actuator 128. FIG. 4 depicts the bellows 131 in a fully extended position covering the extendable portion 133 of the lifting shoe actuator 128. However, FIGS. 5-8 depict the bellows 131 only in a fully retracted position so as to show the extendable portion 133 of the lifting shoe actuator 128. The extendable portion 133 of the lifting shoe actuator 128 provides the motive force that deploys the lifting shoe 106*a*.

Figure 5:
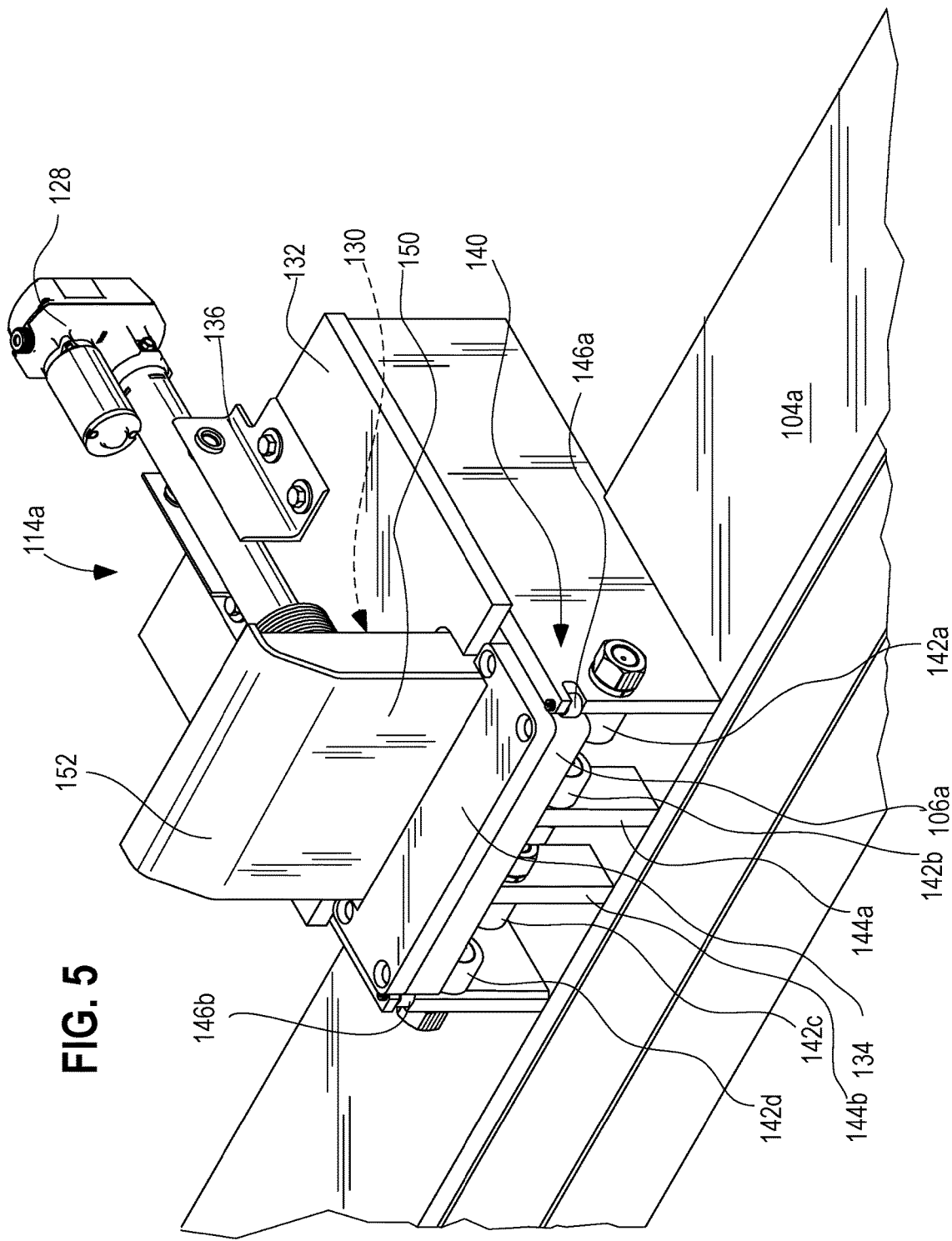
FIGS. 5-8 are isometric views from varying angles of the lifting shoe of FIG. 4 in various stages of deployment.
Figure 7:
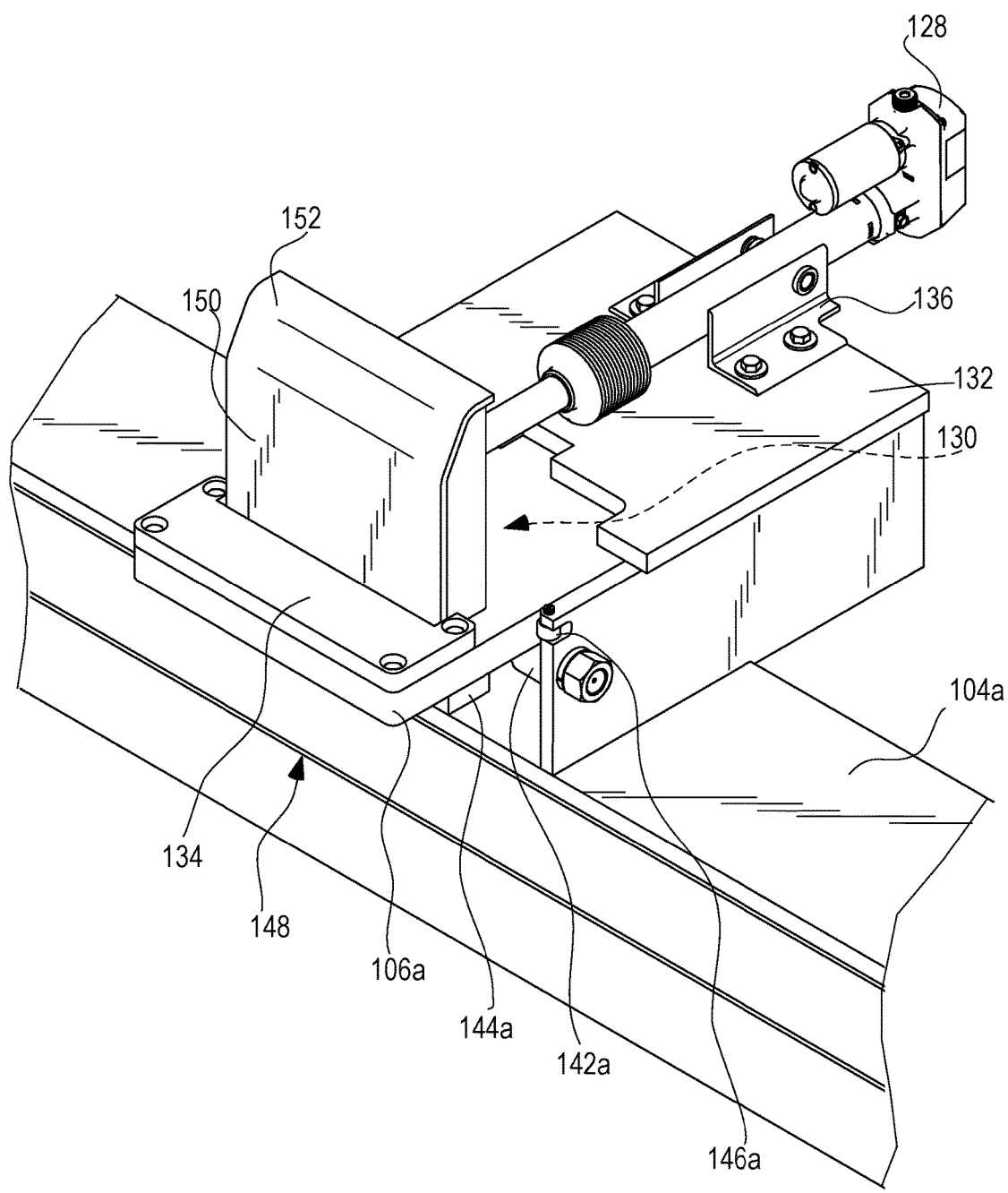

The lifting shoe 106*a* is guided by three sets of rollers shown in FIG. 5. Two pairs of horizontal rollers 142*a*, 142*b*, 142*c*, 142*d* are mounted near the front of the lifting shoe housing 132. An interior roller of each set is mounted to one of two interior struts 144*a*, 144*b* that support the lifting shoe housing 132. The horizontal rollers 142*a*, 142*b*, 142*c*, 142*d* contact the bottom of the lifting shoe 106*a*. A pair of vertical rollers 146*a*, 146*b* is built into the sides 132*a*, 132*b* of the lifting shoe housing 132. The vertical rollers 146*a*, 146*b* contact the sides of the lifting shoe 106*a*, but may also contact the sides of the lifting shoe pad 134 carried thereon. As the lifting shoe actuator 128 produces horizontal force, the lifting shoe rolls along the sets of rollers from the first, retracted position 140 partially within the lifting shoe housing 132 (FIGS. 5 and 6) to the deployed position 148, distal to the housing 132 (FIGS. 7 and 8). Further, the horizontal rollers 146*a*, 146*b*, 146*c*, 146*d* may carry a portion of the load of the container 102 transferred through the lifting shoe 106*a* to the horizontal rollers 146*a*, 146*b*, 146*c*, 146*d* supporting said lifting shoe 106*a*.

Referring still to FIGS. 5-8, the lifting shoe 106*a* has arranged on the upper surface thereof a vertical guide plate 150. An upper portion 152 of the vertical guide plate 150 is sloped such that if the container 102 is laterally offset upon transfer of the container 102 to the lifting shoes 106 then the container 102 is guided onto the lifting shoe pad. If the container 102 is laterally offset at any one of the lifting shoe assemblies 114*a*, 114*b*, 114*c* by more than plus or minus ½ inch a bottom rail of the container contacts the surface of the sloped upper portion 152 of the vertical guide plate 150, and the container 102 is guided to the center of the containment cavity 112, 118. The vertical guide plate 150 guides the container 102 to within a plus or minus ½-inch range for developing stable contact with the lifting shoe 106*a*. The lifting shoe actuator 128 should be capable of withstanding the sideways forces generated by the container 102 on the surface of the sloped upper portion 152 during the guiding action of the vertical guide plate 150.

Referring now to FIG. 9, the holding shoe 120*a* swivels from the retracted position 154 to a deployed position 156 distal to the holding beam 116*a* once the container 102*a* enters the upper containment cavity 118. Referring again generally to FIG. 2, the lifting beams 104*a*, 104*b* lift the container 102 above the holding shoes 120, which are then deployed with the container 102 held within the upper containment cavity 118 by the lifting beams 104*a*, 104*b* once the lifting beams 104*a*, 104*b* reach the second, upper position 124, so that when the lifting beams 104*a*, 104*b* are retracted back down to the initial, lower position 122 below the lower containment cavity 112, the deployed holding shoes 120 support the weight of the container 102. As the lifting beams 104*a*, 104*b* are automatically lowered to the initial, lower position 122 support of the container 102 is transferred to the appropriate holding shoes 120 on the holding beams 116*a*, 116*b*. Once the container 102 is stored in the upper containment cavity 118, an overhead crane or other suitable means may then remove the container 102*a* from the holding shoes 120 and deliver said container 102 to some other location as determined by a yard management system. In this way, the container 102 may enter and exit the upper containment cavity 112 by two paths: the lifting beams 104*a*, 104*b* and/or the overhead crane or other method for removing the container 102.

Figure 13:
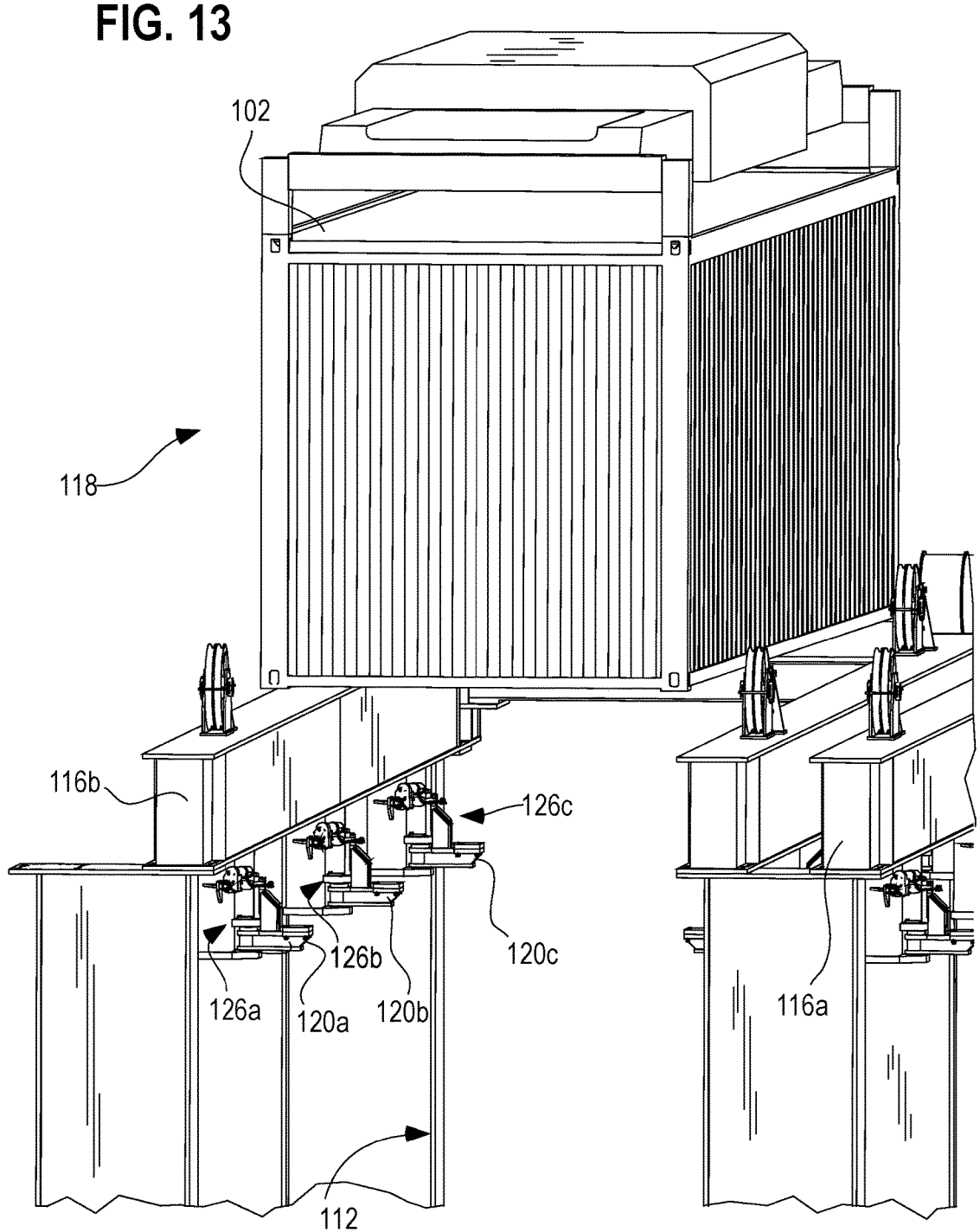
FIGS. 13-18 are isometric views of a single lift beam system in various stages of operation during which a container enters the upper containment cavity from above and is lowered into the lower containment cavity by lifting beams.
Figure 14:
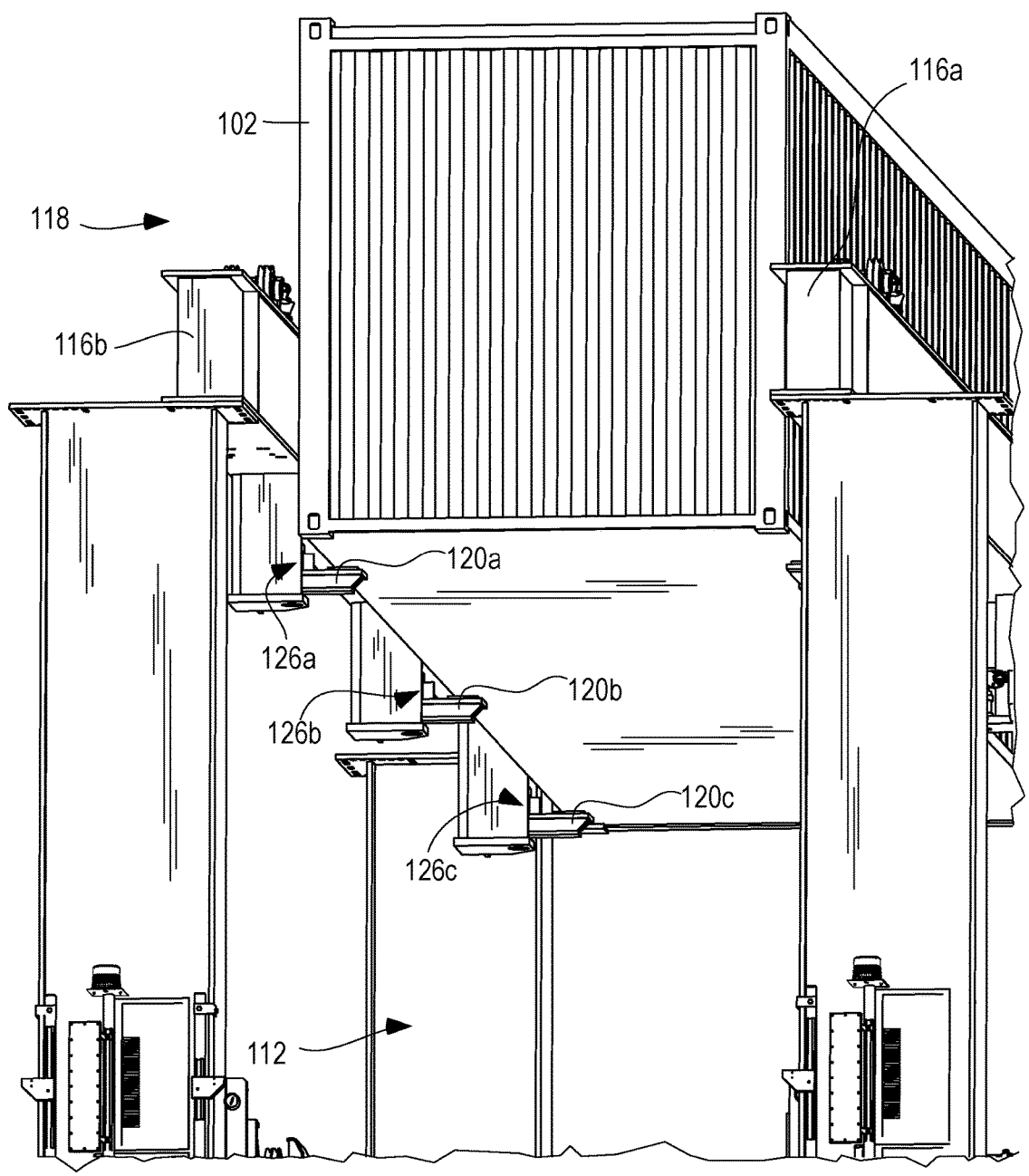

Alternatively, the holding shoes 120 may deploy from the retracted position 154 to the deployed position 156 to accept the container 102 as it is lowered into the upper containment cavity 118 by a spreader 236 from above as depicted in FIG. 13. Further, the holding beams 116*a*, 116*b* may have guide plates arranged along an interior surface of each holding beam 116*a*, 116*b* to assist in guiding the container 102 onto the holding shoes 120 when the container 102 is lowered thereon. Alternatively, guide plates may be disposed on the holding shoes 120*a*, 120*b*, 120*c* as discussed below with reference to FIG. 9.

The holding shoes 120*a*, 120*b*, 120*c* and holding shoe assemblies 126*a*, 126*b*, 126*c* are arranged along the holding beams 116*a*, 116*b* to accommodate containers of varying lengths, however, the holding shoes 120*a*, 120*b*, 120*c* may or may not align with corner castings or interior castings of the container 102. Shipping containers used at sea, and thus likely to be found in a port, are typically of relatively strong construction as compared to some shipping containers used in other settings. Therefore, the holding shoes are not required to contact the container 102 at the casting points.

The spacing of the lifting and holding shoes 106, 120 is not limited inasmuch as the entire edge and walls of the container are strong enough for the lifting and holding shoes 106, 120 to support the container 102 anywhere along a length thereof. The guide plates on the holding beams 116a, 116b and the holding shoes 120a, 120b, 120c may be aligned or offset.

Referring now to FIGS. 9-12, holding shoe 120a is depicted in varying stages of deployment. The holding shoe assemblies 126a, 126b, 126c and the associated holding shoes 120a, 120b, 120c are substantially identical in operation, differing only in location along the holding beams 116a, 116b (as seen in FIGS. 1 and 2). Therefore, only holding shoe assembly 126a and holding shoe 120a will be described in detail below.

Referring now to FIG. 9, the holding shoe assembly 126a is shown as fixedly attached to the underside of holding beam 116a. The holding shoe assembly 126a includes the holding shoe 120a, a holding shoe actuator 158, a holding shoe assembly mount 160a, 160b, a holding shoe actuator pin 162, a holding shoe actuator mounting pin 164, a holding shoe mounting pole 166, and a holding shoe pad 168.

The holding shoe assembly mount 160a extends down from the lower side of the holding beam 116a. The holding shoe assembly mount 160a may be fixedly attached to the holding beam 116a and/or an integral part of the holding beam 116a. The mount 160a, 160b may be welded to the holding beam 116a, forged or fabricated with the holding beam 116a, or hanging from a connection point with the holding beam 116a. The holding shoe assembly mount 160a may provide a ledge and/or platform for mounting the holding shoe 120a and/or the holding shoe actuator 158.

In the embodiment shown in FIGS. 9-12, the holding shoe mounting pole 166 is positioned between a lower holding shoe assembly mount 160a and a upper holding shoe assembly mount 160b. The holding shoe 120a is then arranged on the holding shoe mounting pole 166 and rotates horizontally therebetween from the retracted position 154 to the deployed position 156 distal to the holding beam 116a.

The horizontal rotation of the holding shoe 120a is effectuated by the holding shoe actuator 158. The holding shoe actuator 158 may be connected at a first end 170 either to the holding shoe assembly mount 160a or directly to the holding beam 116a by the holding shoe actuator mounting pin 164. The holding shoe actuator mounting pin 164 provides for rotation of the first end 170 of the holding shoe actuator 158 during extension of the holding shoe 120a. A second end 172 of the holding shoe actuator 158 distal from the first end 170 is pinned to the holding shoe 120a by the holding shoe actuator pin 162. The holding shoe actuator pin 162 is mounted on the upper surface of the holding shoe 120a near the location where the holding shoe mounting pole 166 penetrates the holding shoe 120a.

Figure 10:
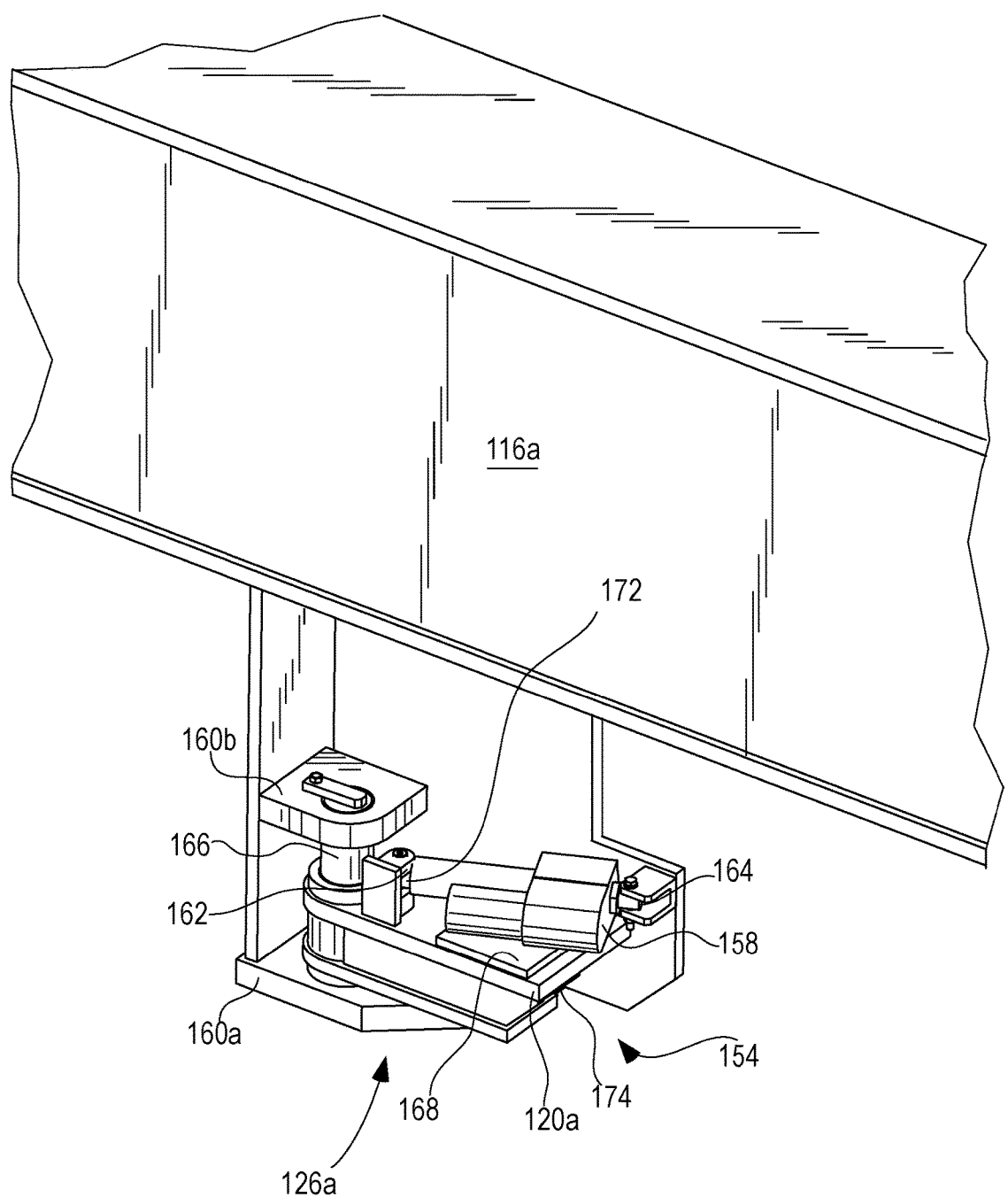
FIGS. 10-12 are isometric views from varying angles of the holding shoe of FIG. 9 in various stages of deployment.
Figure 11:
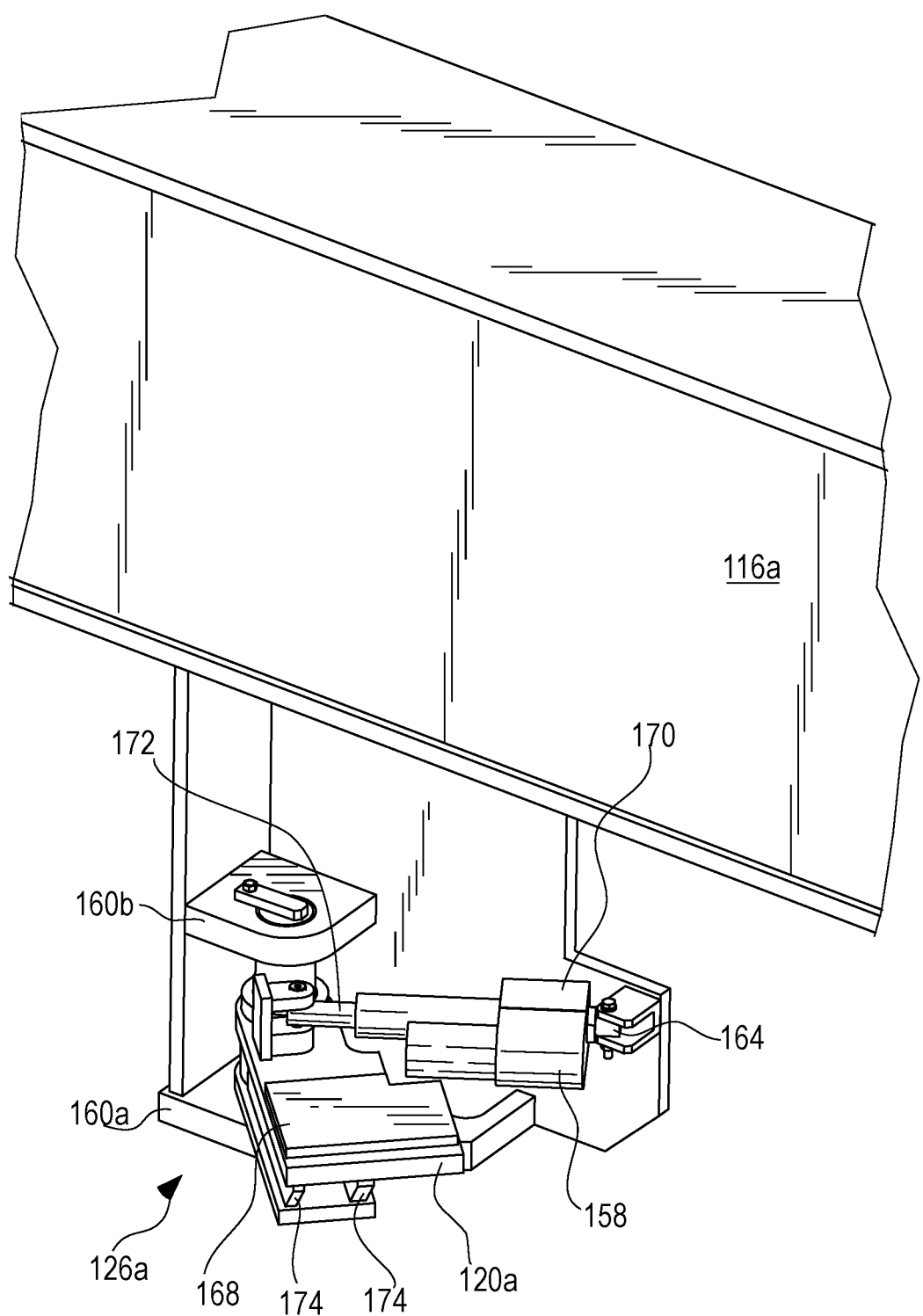
Figure 12:
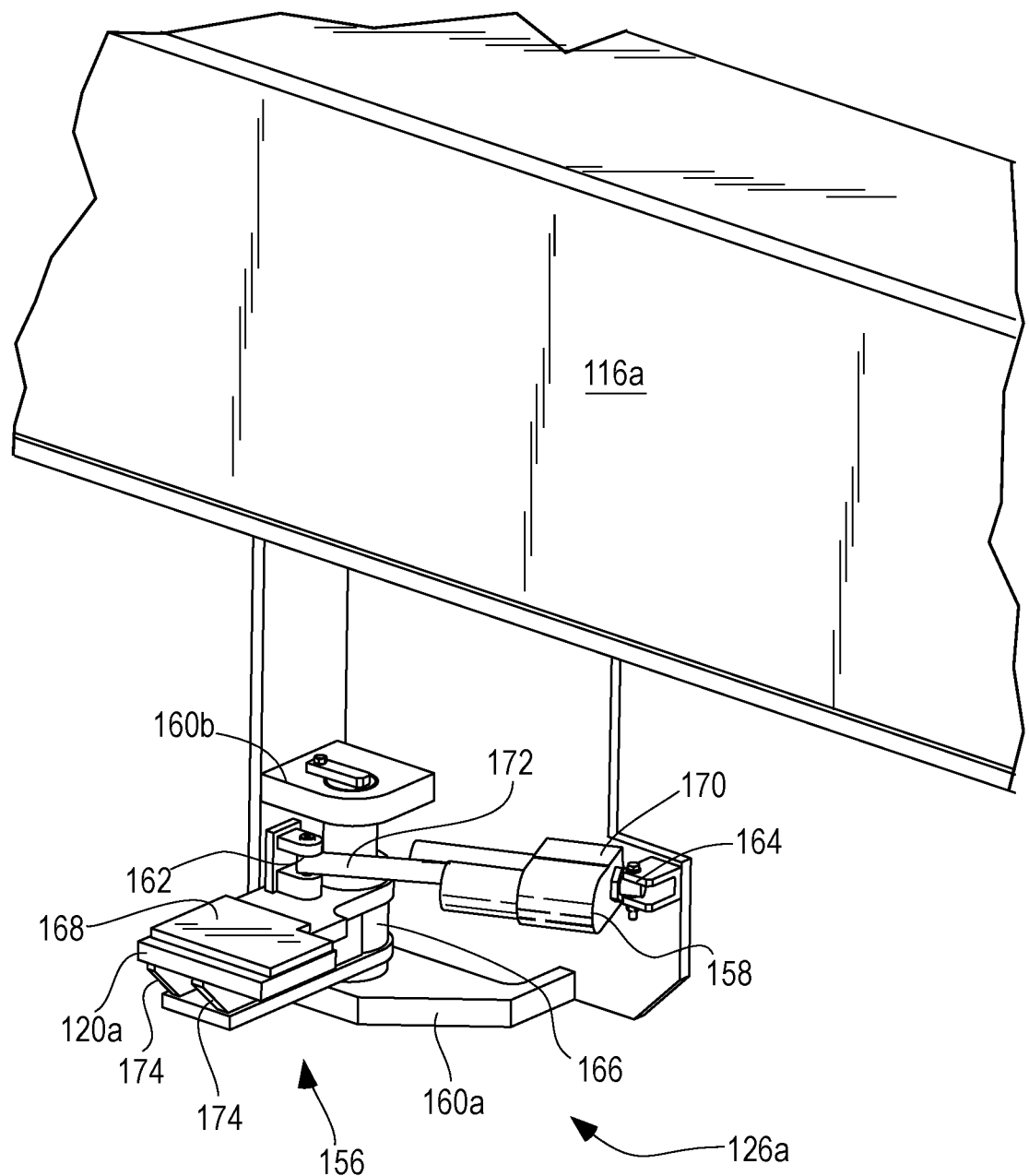

FIG. 9 shows an alternative arrangement of the holding shoe assembly 126a as compared with FIGS. 10-12. FIG. 9 includes a holding shoe guide plate 173. The holding shoe guide plate 173 provides an angled surface 175 that guides the container 102 entering the upper containment cavity 118 to alignment with the holding shoes 120 that support the container 102 while it is stored in the upper containment cavity 118. Whether the lifting beams 104a, 104b or an overhead crane delivers the container 102 into the upper containment cavity 118, proper alignment with the holding shoes 120 and the hold shoe pads 168 may help to direct the container 102 to support from the holding shoes 120 that is stable. When the container 102 is delivered by a crane from overhead, the holding shoe guide plates 173 provide alignment assistance for both the holding shoes 120 and the lifting shoes 106 that may retrieve the container 102 therefrom at a later time.

Further in the alternative arrangement of the holding shoe assembly 126a, as depicted in FIG. 9, the second end 172 of the holding shoe actuator 158 is pinned to the holding shoe 120a at a higher point, closer to the underside of the holding beam 116a, on the holding shoe 120a. Alternatively, the second end 172 of the holding shoe actuator 158 may instead be pinned to a back or side surface of the holding shoe guide plate 173.

Referring now to FIGS. 10-12, the actuation of the holding shoe actuator 158 is depicted. As the holding shoe actuator 158 produces linear force and extends against the holding shoe actuator pin 162, the second end of the actuator 158 itself does not move all the way out into the upper containment cavity 118. Instead, in this example embodiment, the holding shoe actuator 158 linearly extends against the holding shoe actuator pin 162. In turn, the holding shoe actuator pin 162 pushes the holding shoe 120a against the holding shoe mounting pole 166. The holding shoe 120a is levered against the pole 166 and rotates around said pole 166. This rotation swings the end of the holding shoe 120a, carrying the holding shoe pad 168, out from underneath the holding beam 116a in the retracted position (FIG. 10) to the deployed position 154 (FIG. 12).

Referring again to FIG. 9, in a configuration where the holding shoe actuator 158 has the second end 172 thereof pinned to the back of the holding shoe guide plate 173, the linear force produced by the holding shoe actuator 158 is transferred from the holding shoe guide plate 173 through the location where the holding shoe guide plate 173 is mounted to the holding shoe 120a to produce the radial movement of the holding shoe 120a around the holding shoe mounting pole 166.

FIG. 11 depicts the holding shoe 120a during mid-deployment. As seen in FIG. 12, once the holding shoe actuator 158 rotates the holding shoe 120a into position, the holding shoe pad 168 is within the upper containment cavity 118 and prepared to bear the load of the container 102. As seen in FIGS. 10-12, the holding shoe 120a includes struts 174 underneath the holding shoe pad 168 that assist the upper surface of the holding shoe 120a in supporting the load of the container 102. More struts 174 may be included in alternative embodiments, or struts 174 may be omitted. If struts 174 are omitted then the holding shoe 120a may be of thicker, solid construction.

If the container 102 is still being stored in the upper containment cavity 118 when another container 102b is delivered to the lower containment cavity 112 by a chassis, this may be the same chassis that delivered the first container 102a or another chassis, the container 102 may still be lifted off a chassis by the lifting beams 104a, 104b. The next container 102 is then stored in the lower containment cavity 112 until the container 102 in the upper containment cavity 118 is removed by one of the other means mentioned hereinabove, such as an overhead crane. Referring again to FIG. 2, the 40-foot long container 102a is located in the lower containment cavity 112. When the container 102 is being held in the lower containment cavity 112, the lift beam system 101 has two positions at which to hold the container 102 depending on the status of the container 102 and the system 101. When the container 102 is in a storage position the lifting pad 134 of the lifting shoes 106 are approximately forty-two inches above the ground. However, when the lifting shoes 120 move to contact and pick up the container 102 for lifting it to the upper containment cavity 118, typically the lifting pads 134 contact the container 102 at approximately sixty inches above the ground.

As discussed above, generally, the lift beams 104a, 104b are arranged to lift the container 102 from the lower containment cavity 112 to the upper containment cavity 118 where the container 102 may be stored on the holding shoes 120. According to an example container-handling sequence, the inbound container 102 is removed from a ship and transferred to a land-based container transport system such as a rail car or a tractor-trailer chassis. However, the lift beam system 101 may also handle outbound containers 102.

Referring now to FIG. 13, an example of the inbound container-handling sequence may begin when an overhead crane or other suitable means delivers a container 102 to the upper containment cavity 118 of the lift beam system 101. The crane may lower the container 102 onto the deployed holding shoes 120 of the holding beams 116a, 116b (FIG. 14) such that the lifting beams 104a, 104b may rise (FIG. 15) until the lifting shoes 106 thereon meet the container in the second, upper position 124 (FIG. 16). As seen in FIG. 17, the load of the container 102 is transferred from the holding shoes 120 to the lifting shoes 106, and then the lifting beams 104a, 104b may lower (FIG. 18) the container from the second, upper position 124 to the initial, lower position 122.

Figure 15:
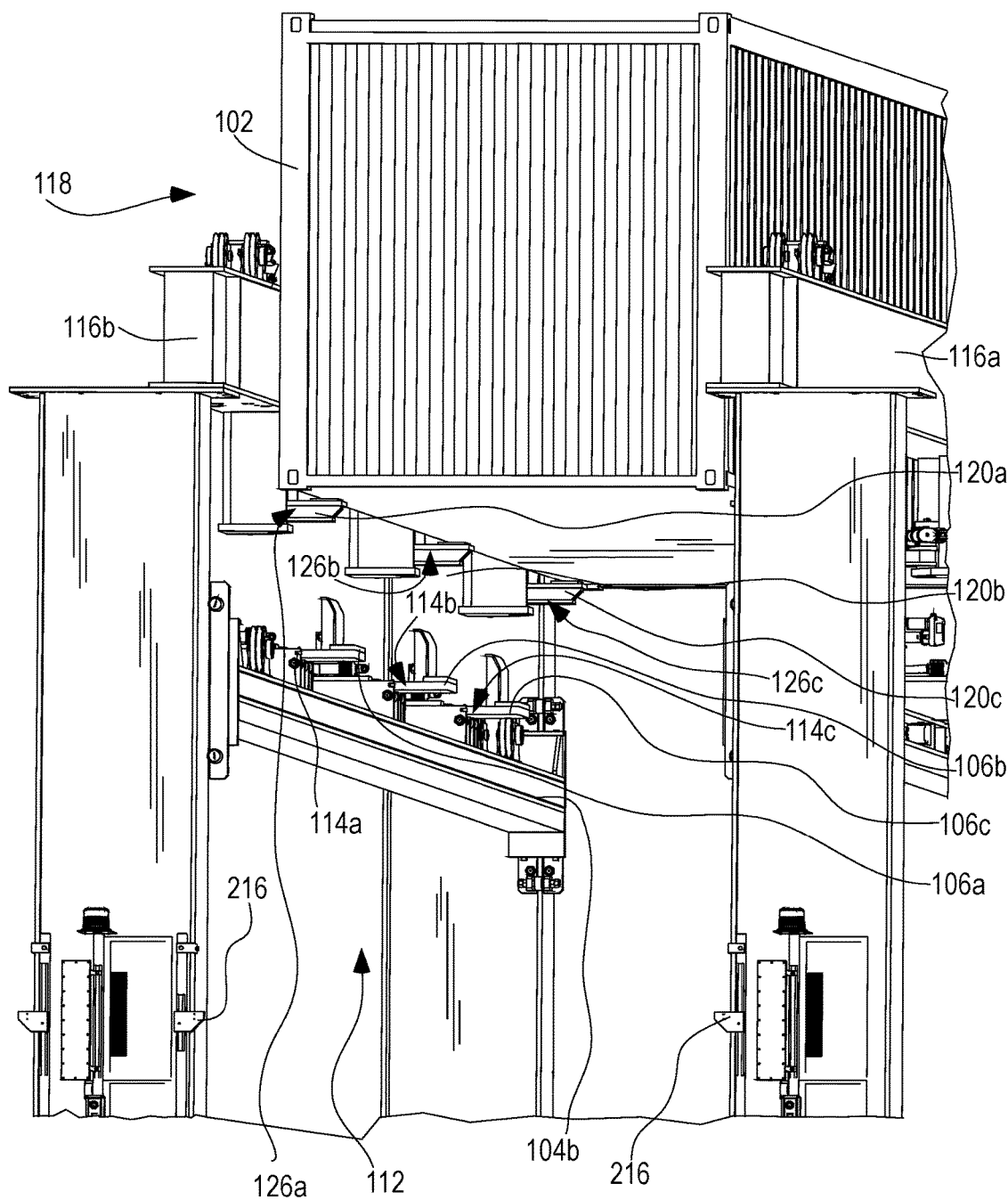
Figure 16:
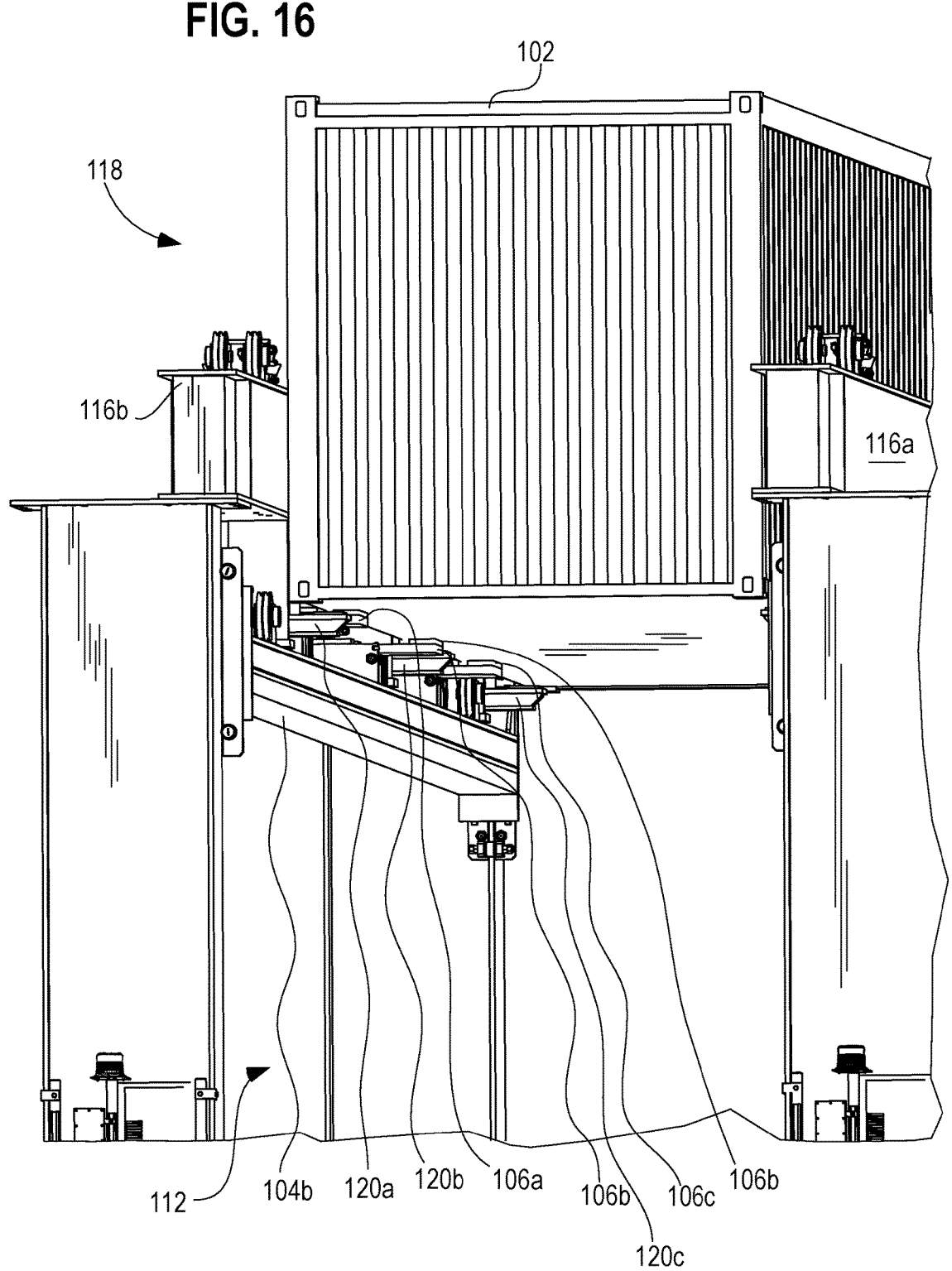
Figure 17:
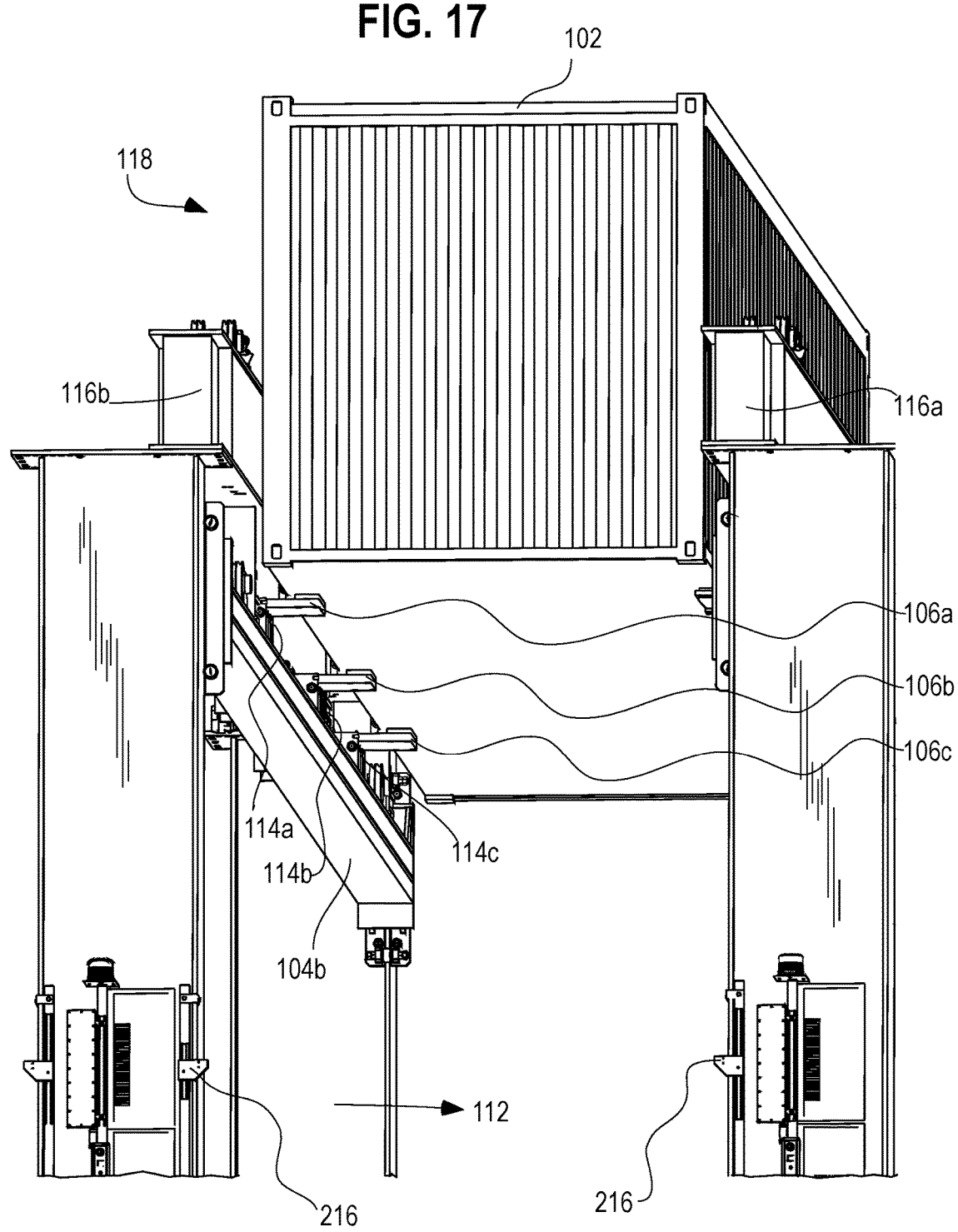
Figure 18:
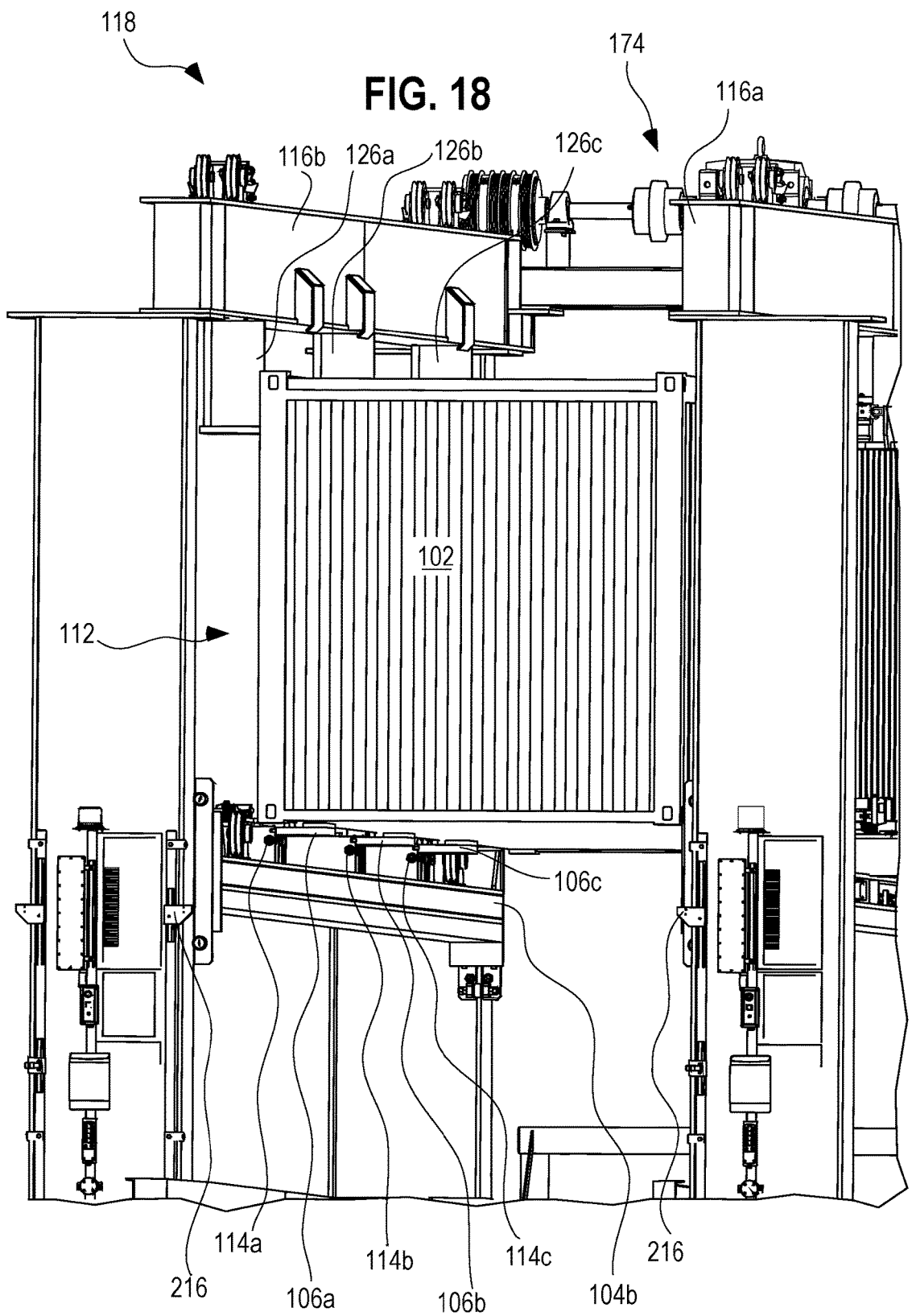

Referring still to FIGS. 15-17, if no container is currently being supported on the lifting beams 104a, 104b the lift beam automatically raises to its maximum height, and lifts the container from the holding beams 116a, 116b. The holding shoes 120a, 120b, 120c automatically return to the retracted position 154, and the lifting beams 104a, 104b lower the container to the lower containment cavity 112 to await an incoming chassis to remove the container. However, if another container 102 is already present on the lifting beams 104a, 104b in the lower containment cavity 112, then the container 102 delivered to the holding shoes 120a-d is retained on the holding shoes 120a-d until a tractor-trailer and chassis removes the container 102 housed in the lower containment cavity 112.

After the container 102 in the lower containment cavity 112 has been removed by the tractor-trailer chassis, the lifting beams 104a, 104b are raised while maintaining the lifting shoes 106a, 106b, 106c in the deployed, distal position 148 (FIG. 15), and the container 102a located on the holding shoes 120a, 120b, 120c is lifted off said holding shoes 120a, 120b, 120c (FIG. 16). Then, the holding shoes 120a, 120b, 120c, automatically return to the retracted position 154 (FIG. 17), and the lifting beams 104a, 104b lower the container 102a to the lower containment cavity 112 (FIG. 18) to await removal by the tractor-trailer chassis.

Figure 20:
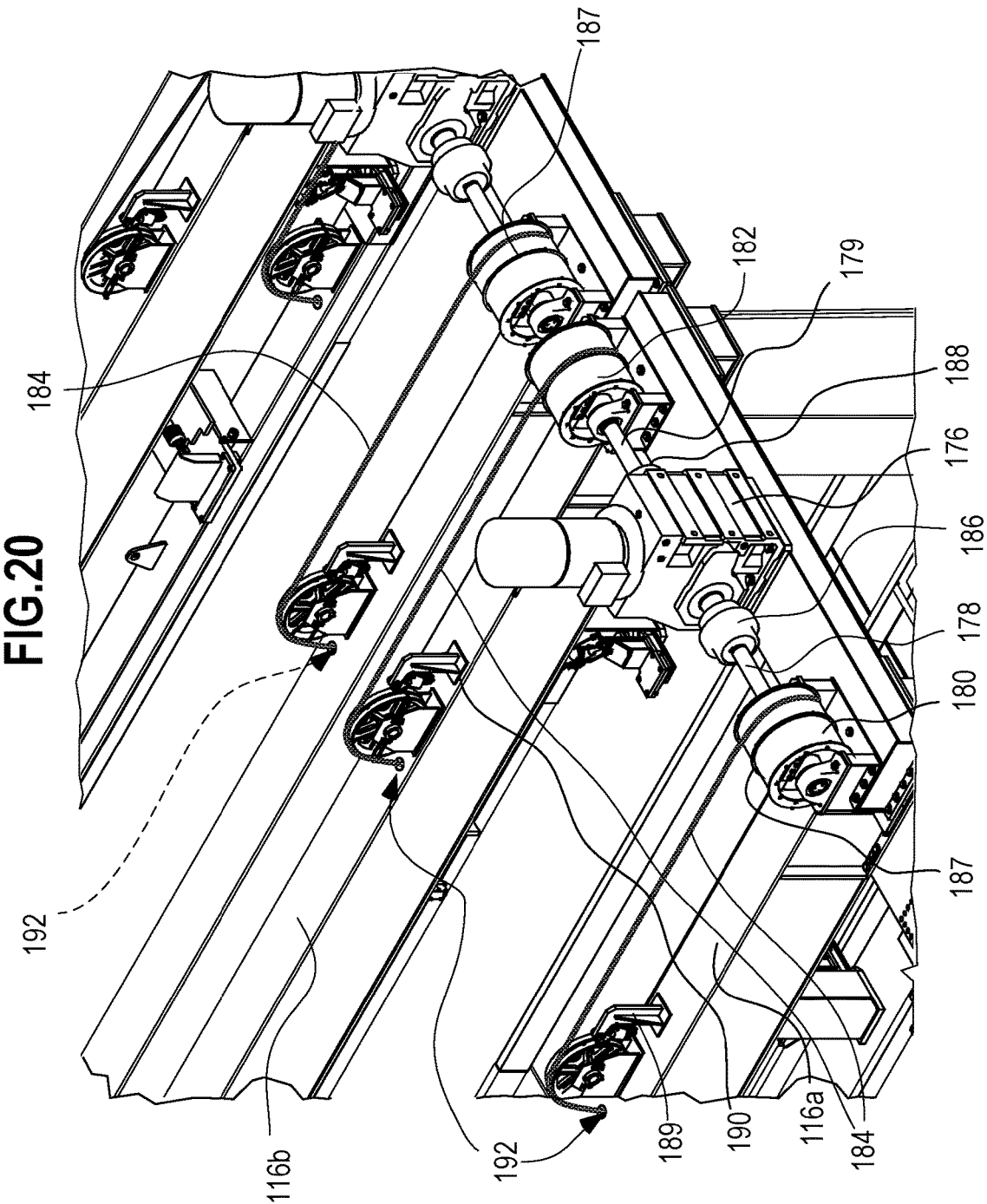
FIG. 20 is a partial isometric view of a holding beam showing details of the connections between the holding beam and the hoisting mechanism of FIG. 19.

Referring now to FIGS. 19 and 20, a hoisting mechanism 174 for the lifting beams 104a, 104b is shown. A motor 176 with dual output shafts 178, 179 drives two wire rope drums 180, 182. The motor may further include a gearbox, shown here within the same housing as the motor 176. The motor 176 and dual output shafts 178, 179 are operated such that both lifting beams 104a, 104b of the lift beam system 101 move simultaneously and in synchronization. In the example discussed herein, the motor 176 for the lift beam system 101 is an electric motor suitable for use alongside a wharf or port. However, in an alternative embodiment, the motor 176 may instead be an internal combustion motor, a pneumatic motor, a hydraulic motor, or any other motor that provides sufficient power to raise the lifting beams 104a, 104b and the load carried thereon.

Each lifting beam 104a, 104b, on the respective (L) and (R) sides of each lift beam system 101, is operatively coupled to the associated dual output shaft 178, 179 via the further associated wire rope drum 180, 182 by one or more wire ropes 184. Each wire rope 184 may be a single 4-part line, or another rope of suitable strength for hoisting the lifting beams 104a, 104b and any size container supported thereon.

In an example embodiment, the motor 176 may be a 60 HP 480 volt AC 3-phase motor. Another motor having differing specifications may be used so long as the selected motor is suitable for lifting loaded shipping containers. The gearbox output shafts 178, 179 are operatively coupled to the respective wire rope drums 180, 182 through associated gear couplings 186, 188 and drive shafts 178, 179 on each side of the motor 176, as shown in FIG. 19. The hoisting mechanism 174 may be mounted across the holding beams 116a, 116b as seen in FIG. 19 or, alternatively, may be mounted on the ground near at the back of the lift beam system 101 outside of the lower containment cavity 112.

Further in the example embodiment, each wire rope drum 180, 182 may include grooves 187. Each holding beam 116a, 116b, as seen in FIGS. 1 and 2, has disposed thereon inner and outer holding beam idler sheaves 189, 190. Each of the inner and outer holding beam idler sheaves accommodates the associated wire rope 184 connected to the respective wire rope drums 180, 182. The wire ropes 184 from each wire rope drum 180, 182 connect to the holding beam idler sheaves 189, 190 and are directed through the holding beams 116a, 116b thereby. Each holding beam idler sheave 189, 190 leads to associated access holes 192 in each holding beam 116a, 116b. The access holes 192 guide the wire ropes 184 vertically to a hook block or wedge socket on each respective lifting beam 104a, 104b.

In an alternative embodiment (not shown), each drum 180, 182 may control two wire ropes 184 that are guided through a pivoted equalizer bar. Therefore, if the wire rope 184 on one side of the equalizer bar breaks, the load carried by the remaining wire rope 184 causes the equalizer bar to pivot near the center thereof. Once the equalizer bar pivots, the remaining wire rope 184 is lodged against an equalizer bar support bracket that mounts the equalizer bar to the respective holding beam 116a, 116b. The pivoting of the equalizer bar in response to a broken wire rope 184 restrains further rotation of the equalizer bar and provides support to a suspended container 102 still being held by the lifting beams 104a, 104b. Thus, the equalizer bar mechanism may provide a suitable safety mechanism for preventing a dropped container in the circumstance of a broken wire rope 184.

Figure 21:
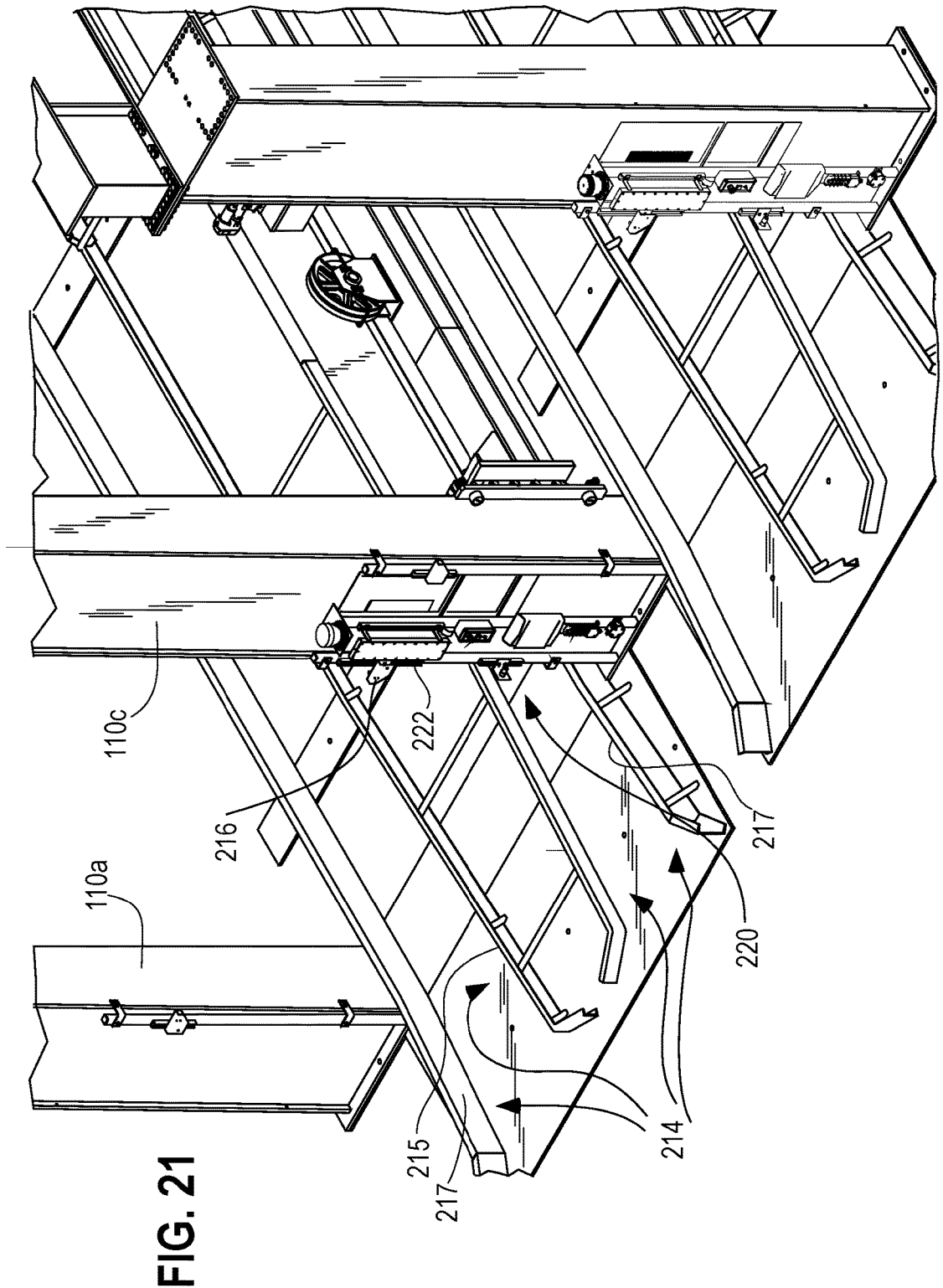
FIG. 21 is a partial isometric view of the lift beam system from the front showing details of an instrument cluster arranged thereon and a combination of the lift beam system with a stationary chassis guide aligning system.

Referring now to FIG. 21, an example embodiment of the lift beam system 101 may be used in combination with a stationary chassis aligning guide 214, such as stationary tire guides. The containers frequently found in ports are typically ninety-six inches wide, however, a chassis carrying the container 102 may have either a ninety-six inch or one-hundred-two inch axle. The stationary chassis aligning guide 214 has inner 215 and outer 217 surfaces capable of guiding and aligning chassis having different axle lengths. The inner surface 215 of the guide 214 contacts the inner surface of the tires on a chassis having a ninety-six inch axle while the outer surface 217 of the guide contacts the outer surface of the tires on a chassis having a one-hundred-two inch axle.

In an alternative embodiment, the stationary chassis aligning guides depicted herein may be replaced with a more active system such as that described in U.S. patent application Ser. No. 14/856,290, filed on Sep. 16, 2015, titled "AUTOMATICALLY ALIGNING CHASSIS GUIDES," which is hereby incorporated by reference in its entirety. In the further alternative, another suitable method, device, or combination thereof for aligning a chassis of a tractor-trailer may be used to improve alignment of the container 102 with the lift beam system 101. The functionality of the chassis guiding mechanisms described hereinabove may instead be carried out by additional or improved driver assistance systems that aid the driver in backing the chassis and container 102 into the lower containment cavity. Chassis with 102-inch tandem axles and chassis with 96-inch tandem axles are accepted. An example chassis guide system 214 may effectively align the entering chassis so long as said chassis approaches within ½ inch off from center.

Also shown in FIG. 21 is an array of sensors and driver assistance devices that enable the tractor-trailer driver to position a chassis at the proper position. A chassis must travel varying depths into the lift beam system 101 depending on the size of the container 102 and the task, such as either delivering the container 102 to the lifting beams 104a, 104b or retrieving the container 102 from the lower containment cavity 112. In alternate embodiments, the sensors and driver assistance devices for detecting the container 102 and aiding the driver described hereinbelow may be replaced or combined with one or more of the devices and systems described in U.S. Pat. No. 8,892,243, issued on Nov. 18, 2014, titled "UNIVERSAL SYSTEM AND METHOD OF HANDLING A CONTAINER," which is hereby incorporated by reference in its entirety.

Referring still to FIG. 21, among the sensors mounted on the vertical beams 110a, 110b is a through-beam laser 216. The through beam laser 216 includes a transmitter and a receiver mounted on opposite sides of the lower containment cavity 112. When a chassis carrying the container 102 is backed into the lower containment cavity 112, the rear edge of the container 102 breaks the through beam laser 216 mounted near the entrance of the lift beam system 101. As the container 102 continues to move into the lower containment cavity 112, the through beam laser 216 is reestablished between the transmitter and receiver across the lower containment cavity 112 once the front edge of the container 102 passes the through beam location. Once the through beam laser 216 is reestablished, thus signaling that the container 102 has fully entered the lower containment cavity 112, the length of the container 102 may be measured.

A distance sensor 218 may be arranged at one end of the lift beam system 101. In an example embodiment, the distance sensor 218 is disposed at the back of the lift beam system 101 just outside the lower containment cavity 112, as seen in FIG. 19. A laser sensor, sonic sensor, or another suitable sensor may be used to determine the length of the container 102 by comparing a distance between the distance sensor 218 and the container 102 with the data from the through beam sensor 216 regarding when the container 102 fully entered the containment cavity 112. Alternatively, if the through beam laser 216 has a known location along the length of the lift beam system 101, this known location may be used in conjunction with the distance sensor 218 to determine useful information regarding the container 102.

The container length data is stored in the PLC (programmable logic control). Container length may be used to determine the proper stopping position/depth of the container 102 within the bay, or to actuate a driver assistance system 220 (also shown in FIG. 21 as disposed on at least one of the vertical beams 110a, 110b). The PLC may retain the container length data in a memory so that any incoming empty chassis may be properly positioned to accept the container 102 already stored in the lower containment cavity 112. Furthermore, the container length data determines which lifting shoes 106a, 106b, 106c are to be used when hoisting the container 102. The combination of container length information and the driver assistance system 220, enables the lift beam system 101 to accurately align the container 102 with the appropriate lifting shoes 106 and holding shoes 120, thereby utilizing the appropriate lifting and holding shoes 106, 120 for the size of any particular container. The functionality of the distance sensor 218 and the driver assistance system 220 may, in part, determine the number of lifting and holding shoes 106, 120 disposed on the lift beam system 101. Sensors and driver assistance systems having higher degrees of accuracy allow for fewer lifting and holding shoes 106, 120 spaced to more precisely align with the lengths of shipping containers entering the system. Alternatively, more lifting and holding shoes 106, 120 may provide an additional buffer for the sensors and driver assistance systems such that the lift beam system 101 is capable of tolerating a higher degree of variation in container alignment and size.

The holding beams 116a, 116b may contain further sensors that determine the presence and length of an outbound container. The container 102, once placed on the holding shoes 120a, 120b, 120c, such as by a crane, is measured by a sensor so that the appropriate lifting shoes 106a, 106b, 106c are deployed to lift the container 102 from the holding shoes 120a, 120b, 120a. Again, the container length may be stored in the PLC and used for proper positioning of any incoming tractor-trailer and chassis entering the lower containment cavity 112 to retrieve the container 102 from the lifting beams 104a, 104b of the lift beam system 101.

Further among the cluster of sensors shown in FIG. 21 is the driver assistance system 220. As the driver backs a tractor-trailer and chassis carrying the container 102 into the lower containment cavity 112, the distance measured by the distance sensor 218 may actuate a light bar 222. The light bar 222 includes several rows of LEDs (light emitting diodes) that vary in color. The light bar 222 may have green, red, and yellow LEDs in various quantities and configurations.

In an example embodiment, the light bar 222 includes several rows of yellow LEDs. As the distance sensor 218 determines that the container 102 approaches the point where the driver must cease backing up, rows of yellow LEDs accumulate, building up vertically along the height of the light bar 222. The accumulation of rows of yellow LEDs indicates to the driver that the container 102 is approaching the required stopping point. Thus, as the column of yellow LEDs approaches the top of the light bar 222, the driver recognizes to apply the brakes and halt entrance of the tractor-trailer into the lift beam system 101.

To further aid the driver, when the container 102 is at the required stopping point, an additional row of red LEDs may appear across the top of the light bar 222. The red LEDs signal to the driver that the driver must cease backing in and set the chassis brakes in order to maintain the container 102 in the proper position for lifting. Alternatively, if the driver has backed in too far the row of red LEDs may flash. This indicates that the driver has backed the container 102 too deep within the lower containment cavity 112. When the red LEDs flash, the driver is signaled to pull forward until the red LEDs stop flashing in order to obtain the correct container 102 position.

Once the container 102 is positioned, and after a short time delay, an audible alarm sounds. The sounding of the alarm immediately precedes deployment of the appropriate lifting shoes 106a, 106b, 106c. With the lifting shoes 106a, 106b, 106c extended, the lift beams 104a, 104b automatically lift the container to the required height as determined by the PLC logic, and the status of the holding beams 116a, 116b. When the container 102 has been deposited in the desired location a set of green LEDs may illuminate on the light bar 222 indicating that the driver may exit the lower containment cavity 112 by driving forward.

The distance sensor 218 shown in FIGS. 19 and 19A may have an associated assembly 224 with plural vertical positions. The distance sensor assembly 224 may have a home position 226, which is fully raised to a height for sensing the distance to the container 102, as seen in FIGS. 19 and 19A. An intermediate position, such that the sightline of the sensor is lowered to a level in FIG. 19A denoted by line 228, may be a suitable vertical height for sensing the distance to an incoming 20 ft. chassis. Further, a full down position, such that the sightline of the sensor is lowered to a level denoted by line 230 in FIG. 19A, may be suitable for sensing the distance to an incoming 40 ft. or 45 ft. chassis. To reach the intermediate position 228 and the full down position 230, the distance sensor 218 slides along the vertical length of the distance sensor assembly 224

An appropriate position for the distance sensor assembly 224 is determined by the PLC logic. The movement of the distance sensor assembly 224 is further controlled by command signals from said PLC. The PLC signals may operate a servomotor 232 with a position feedback feature. A proximity switch 234 may further be utilized to verify that the distance sensor assembly 224 has reached the home position 226. Movement of the sensor assembly 224 may operate according to an algorithm such that the sensor assembly 224 moves the sensor from the full down position 230 to the home position 226 until a chassis is detected therealong.

Figure 22:
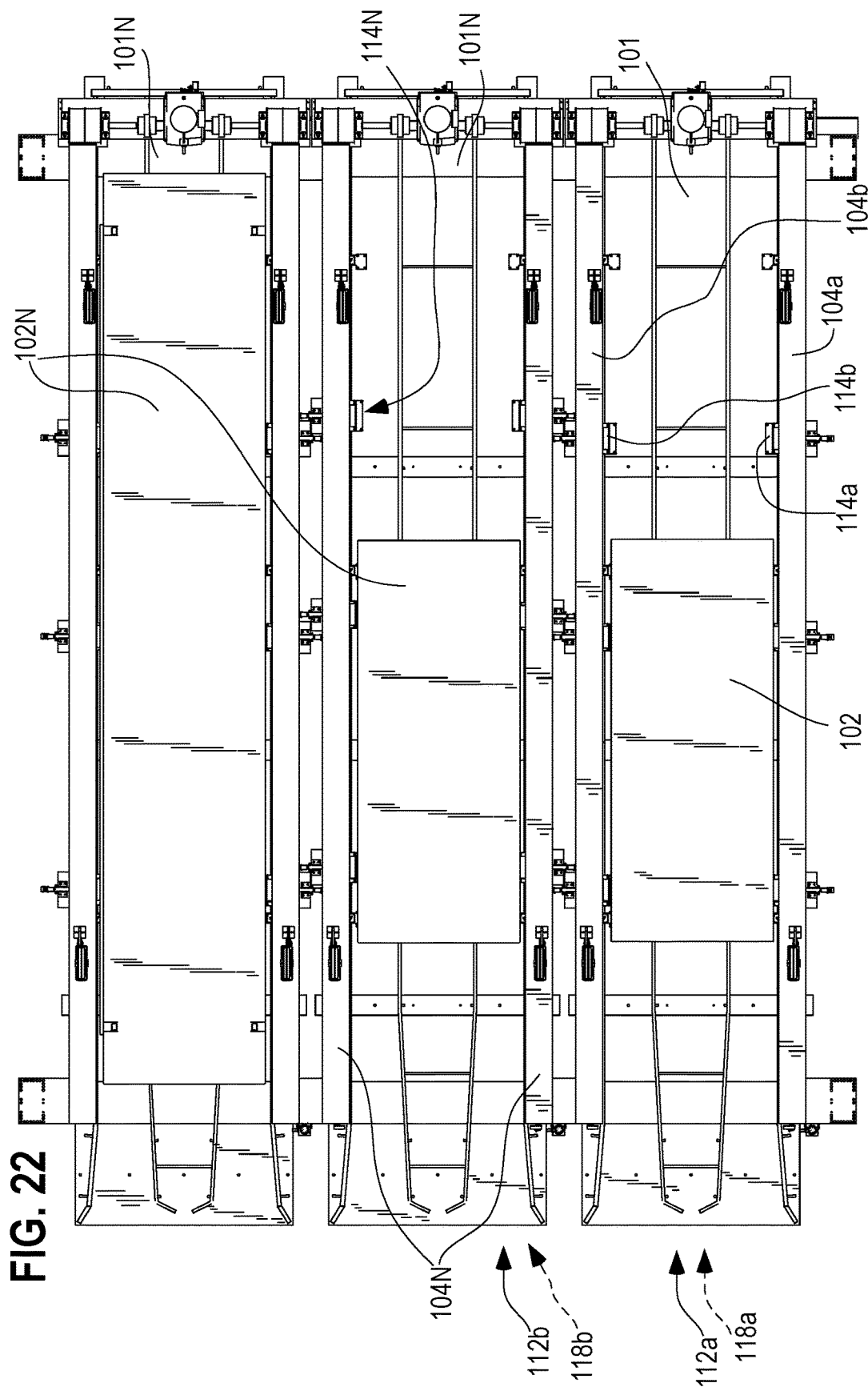
FIG. 22 is a plan view of a port lift beam system having three lift beam systems arranged side-by-side.

As seen in FIG. 1 adjacent lift beam systems 101 share a common column. Referring now to FIG. 22, the port lift beam system 100 is designed so that the number of adjacent systems may be increased as required to accommodate the container handling volume of a particular site. The port lift beam system 100 is expanded by adding additional vertical beams 110N at the appropriate center distance and mounting additional sets of horizontal beams 108N, lift beams 104N, and hoist assemblies.

The lifting shoe assemblies 114a, 114b, 114c extend beyond the edge of the lifting beams 104a, 104b opposite the lifting shoes 106a, 106b, 106c. Therefore, in order to minimize the distance from containment cavity 112a, 118a center to containment cavity 112b, 118b center, the lift shoe assemblies 114a, 114b, 114c on one set of lifting beams 104a, 104b must be offset in a lengthwise direction from the lifting shoe assemblies 114N on the lifting beam 104N of an adjacent lift beam system 101N that shares a common vertical beam 110a, 110b, 110c, 110d. FIG. 22 depicts a configuration having first, second, and third lift beam systems 101 arranged side-by-side. The lift beam systems 101 are organized such that containers 102 of a given length are stored inline on the holding beams 116a, 116b, and the lift beams 104a, 104b of the side-by-side systems 101. The first and second lift beam systems 101 are adjacent one another and share the support of one or more vertical beams aligned between the first and second lift beam systems 101.

The embodiment(s) detailed above may be combined, in full or in part, with any alternative embodiment(s) described.

As many changes could be made in the above constructions without departing from the scope of the disclosure, it is intended that all matter contained in the above description or shown in the accompanying drawings, can be interpreted as illustrative and not in a limiting sense.

INDUSTRIAL APPLICABILITY

Important advantages of the port lift beam system include the increased throughput of shipping containers and the cargo carried therein. Typical port operation may involve a quayside crane arranged along the wharf or harbor that unloads inbound containers from a container ship. The inbound containers are loaded onto drayage carts and moved around the port thereby. Next, the drayage carts transport the shipping containers to an area where the containers may be stacked by another crane and eventually loaded onto a chassis for removal from the port location.

However, the port lift beam system described herein provides that a container may be off-loaded from a ship directly to the lift beam system. Then, the same container may be loaded directly to a chassis by operation of the lift beam system. The port lift beam system shown and described may reduce both the handling time and the space needed for such operations. The port lift beam system may provide the advantage of removing equipment and/or personnel frequently utilized by the typical port to perform loading/unloading operations. Removal of some of this typical equipment and/or personnel may reduce the number of events and movements performed in loading/unloading shipping containers, obviating certain potential accidents associated therewith and creating an overall safer operation. The reduced handling of the shipping containers may also decrease the likelihood of possible damage and/or misplacement of cargo thereby avoiding costly delays. The reduction in handling and increased safety of the operation improves the efficiency of a port utilizing the system described herein.

The port lift beam system provides an efficient means of moving large quantities of cargo while decreasing environmental impact. The use of the port lift beam system to improve the efficiency of port operations aids in maintaining the environmentally friendly nature of a particular port. The port lift beam system may utilize electric power thus minimizing the emission of air pollutants, possible fuel spillage, and contaminated storm water runoff. The port lift beam system may further assist ports in adapting sustainable practices that preserve natural resources while ensuring economic growth.

Another important advantage of the port lift beam system is the potential combination of such system with stationary tire guides or with the Automatically Aligning Chassis Guides. The port lift beam system provides the further advantage of a combined and uniform sensor arrangement that provides a number of options for driver assistance systems, thus further increasing the efficiency of the port lift beam system as compared to typical container loading/unloading operations. The sensor arrangement may further increase the efficiency and effectiveness of PLC logic controlling each individual lift beam system and the logic control operating the port as a whole.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. A system for handling shipping containers comprising:
   first and second lifting beams forming a lower containment cavity;
   first and second holding beams forming an upper containment cavity;
   a plurality of vertical beams wherein the plurality of vertical beams support the first and second lifting beams and the first and second holding beams;
   a hoisting mechanism that raises and lowers the first and second lifting beams;
   first and second pluralities of lifting shoes disposed respectively on each of the first and second lifting beams and configured to support the shipping container when the shipping container is in the lower containment cavity or as the shipping container is raised to or lowered from the upper containment cavity; and
   first and second pluralities of holding shoes disposed respectively on each of the first and second holding beams and configured to support the shipping container when the shipping container is in the upper containment cavity;
   wherein the first and second lifting beams are configured to transfer the shipping container between the lower containment cavity and the upper containment cavity; and
   wherein the first and second lifting beams, the first and second holding beams, the plurality of vertical beams, and the hoisting mechanism are arranged to form a lift beam system.

2. The system of claim 1, where:
   the first and second pluralities of lifting shoes are configured to support the shipping container once the shipping container enters the lower containment cavity; and
   the first and second lifting beams are configured to raise the shipping container from the lower containment cavity to the upper containment cavity.

3. The system of claim 2, where:
   the first and second pluralities of lifting shoes are configured to transfer support of the shipping container to the first and second pluralities of holding shoes when the shipping container is in the upper containment cavity; and the first and second pluralities of holding shoes are configured to support the shipping container in the upper containment cavity while the first and second lifting beams are lowered from the upper containment cavity to the lower containment cavity.

4. The system of claim 3, where:
   the first and second pluralities of lifting shoes are configured to support an additional shipping container once the first and second lifting beams are lowered from the upper containment cavity to the lower containment cavity; and
   the first and second pluralities of lifting shoes are configured to support the additional shipping container in the lower containment cavity.

5. The system of claim 1, where:
   the first and second pluralities of holding shoes are configured to support the shipping container while the first and second lifting beams are raised from the lower containment cavity to the upper containment cavity once the shipping container enters the upper containment cavity.

6. The system of claim 5, where:
   the first and second pluralities of holding shoes are configured to transfer support of the shipping container to the first and second pluralities of lifting shoes when the shipping container is in the upper containment cavity; and
   the first and second pluralities of lifting shoes are configured to support the shipping container while the first and second lifting beams are lowered from the upper containment cavity to the lower containment cavity thereby lowering the shipping container.

7. The system of claim 6, where:
   the first and second pluralities of holding shoes are configured to support an additional shipping container once the first and second lifting beams are lowered from the upper containment cavity to the lower containment cavity; and
   the first and second pluralities of holding shoes are configured to support the additional shipping container in the upper containment cavity.

8. The system of claim 5, wherein the first and second lifting beams are configured to move from the lower containment cavity to the upper containment cavity automatically in response to the shipping container entering the upper containment cavity.

9. The system of claim 1, where:
   the first and second pluralities of lifting shoes are disposed along the first and second lifting beams, respectively, such that the lifting shoes of the first and second pluralities are arranged to support shipping containers of varying lengths.

10. The system of claim 1, further comprising:
    third and fourth lifting beams;
    third and fourth holding beams;
    a second plurality of vertical beams wherein the plurality of vertical beams support the third and fourth lifting beams and the third and fourth holding beams;
    third and fourth pluralities of lifting shoes disposed respectively on each of the third and fourth lifting beams;
    third and fourth pluralities of holding shoes disposed respectively on each of the third and fourth holding beams; and
    a second hoisting mechanism that raises and lowers the third and fourth lifting beams;

wherein the third and fourth lifting beams, third and fourth holding beams, and the second plurality of vertical beams, and the second hoisting mechanism are arranged adjacent the lift beam system to form a second lift beam system.

11. The system of claim 10, where:
at least two vertical beams are of the first and second pluralities of vertical beams arranged to provide support for both the lift beam system and the second lift beam system.

12. The system of claim 11, where:
the first and second pluralities of lifting shoes are disposed along the first and second lifting beams, respectively, such that the lifting shoes of the first and second pluralities are arranged to support shipping containers of varying length; and
the third and fourth pluralities of lifting shoes are disposed along the third and fourth lifting beams, respectively, such that the lifting shoes of the third and fourth pluralities are arranged to support shipping containers of varying length; and
wherein the first and second pluralities of lifting shoes and the third and fourth pluralities of lifting shoes are offset from one another.

13. The system of claim 1, further comprising:
a sensor for determining a length of the shipping container when the shipping container enters the lower containment cavity.

14. The lift beam system of claim 1, further comprising:
a tire guide system arranged to guide a chassis carrying the shipping container into the lower containment cavity such that the shipping container aligns with the first and second pluralities of lifting shoes.

15. The system of claim 1, where:
the first and second pluralities of holding shoes are configured to support a first shipping container when the first shipping container is in the upper containment cavity; and
the first and second pluralities of lifting shoes are configured to support a second shipping container when the second shipping container is in the lower containment cavity;
wherein the first and second lifting beams transfer the first shipping container from the lower containment cavity to the upper containment cavity; and
wherein the first and second pluralities of holding shoes and the first and second pluralities of lifting shoes store the first and second shipping containers in the upper and lower containment cavities, respectively.

16. The system of claim 1, where:
the first and second pluralities of holding shoes are configured to support a first shipping container when the first shipping container is in the upper containment cavity; and
the first and second pluralities of lifting shoes are configured to support a second shipping container when the second shipping container is in the lower containment cavity;
wherein the first and second lifting beams transfer the first shipping container from the upper containment cavity to the lower containment cavity; and
wherein the first and second pluralities of holding shoes and the first and second pluralities of lifting shoes store the first and second shipping containers in the upper and lower containment cavities, respectively.

17. A system for raising and lowering shipping containers, comprising:

at least one lifting beam having a plurality of lifting shoes disposed therealong;
at least one holding beam having a plurality of holding shoes disposed therealong;
a lower containment cavity substantially below the at least one holding beam; and
an upper containment cavity substantially above the at least one holding beam;
wherein the lifting beam moves between a first position in the lower containment cavity and a second position in the upper containment cavity; and
wherein a container is transferred between the plurality of lifting shoes and the plurality of holding shoes when the lifting beam is at the second position.

18. The system of claim 17, where:
the lifting shoes have a retracted position and a deployed position; and
wherein the at least one lifting beam is in the first position when the container enters the upper or lower containment cavity; and wherein at least one of the plurality of lifting shoes move from the retracted position to the deployed position in response to the container entering the upper or lower containment cavity.

19. The system of claim 18, where:
the holding shoes have a retracted position and a deployed position; and
wherein at least one of the plurality of holding shoes moves from the retracted position to the deployed position in response to the container entering the upper containment cavity.

20. The system of claim 19, wherein once at least one of the plurality of lifting shoes moves to the deployed position, the lifting beam raises from the first position in the lower containment cavity to the second position in the upper containment cavity thereby contacting the container with the at least one of the plurality of lifting shoes.

21. The system of claim 20, where:
the at least one of the plurality of lifting shoes is arranged to contact the container when the container is in the lower containment cavity so that the at least one of the plurality of lifting shoes supports the container; and
the at least one lifting beam operating with the at least one of the plurality of lifting shoes to lift the container from the lower containment cavity to the upper containment cavity.

22. The system of claim 21, where:
the at least one lifting beam is configured to be moved from the second position in the upper containment cavity to the first position in the lower containment cavity; and
the at least one of the plurality of holding shoes is configured to support the container when the at least one lifting beam moves to the first position, thereby holding the container in the upper containment cavity.

23. The system of claim 20, where:
the at least one of the plurality of holding shoes is configured to support the container in the upper containment cavity when the container enters the upper containment cavity from above; and
the at least one lifting beam is configured to be moved from the first position in the lower containment cavity to the second position in the upper containment cavity while the at least one of the plurality of holding shoes supports the container.

24. The system of claim 23, where:
the at least one lifting beam is configured to be moved to the second position in the upper containment cavity thereby supporting the container with the at least one of the plurality of lifting shoes;

the at least one of the plurality of holding shoes is configured to be moved from the deployed position to the retracted position while the at least one of the plurality of lifting shoes supports the container in the upper containment cavity; and the at least one lifting beam is configured to be moved from the second position in the upper containment cavity to the first position in the lower containment cavity thereby lowering the container once the at least one of the plurality of holding shoes moves to the retracted position.

* * * * *